US011855979B2

(12) United States Patent
Basu et al.

(10) Patent No.: US 11,855,979 B2
(45) Date of Patent: Dec. 26, 2023

(54) PROXY CONFIGURED TO DYNAMICALLY FAILOVER AUTHENTICATION TRAFFIC TO A BACKUP AUTHENTICATION SYSTEM

(71) Applicant: Microsoft Technology Licensing, LLC, Redmond, WA (US)

(72) Inventors: Anirban Basu, Sammamish, WA (US); Oren Jordan Melzer, Redmond, WA (US); Kamen K. Moutafov, Sammamish, WA (US); Victor Boctor, Bellevue, WA (US); Shuang Lu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 17/334,649

(22) Filed: May 28, 2021

(65) Prior Publication Data
US 2022/0385649 A1 Dec. 1, 2022

(51) Int. Cl.
*H04L 9/40* (2022.01)
*H04L 67/55* (2022.01)
*H04L 67/561* (2022.01)

(52) U.S. Cl.
CPC ............ *H04L 63/083* (2013.01); *H04L 63/20* (2013.01); *H04L 67/55* (2022.05); *H04L 67/561* (2022.05)

(58) Field of Classification Search
CPC ....... H04L 63/083; H04L 63/20; H04L 67/55; H04L 67/561; H04L 63/08; H04L 67/567; H04L 67/563; H04L 69/40
See application file for complete search history.

(56) References Cited

U.S. PATENT DOCUMENTS 8,155,275 B1  4/2012  Barnes et al.
9,967,395 B1  5/2018  Karimli et al.
(Continued)

FOREIGN PATENT DOCUMENTS

CN     105430016 A    3/2016
WO    2014176539 A1  10/2014

OTHER PUBLICATIONS

"What is a Reverse Proxy? | Proxy Servers Explained", Retrieved From: https://web.archive.org/web/20210510122751/https://www.cloudflare.com/learning/cdn/glossary/reverse-proxy/, May 10, 2021, 6 Pages.

(Continued)

*Primary Examiner* — Kambiz Zand
*Assistant Examiner* — Aubrey H Wyszynski
(74) *Attorney, Agent, or Firm* — Wade IP Law PLLC

(57) ABSTRACT

Techniques are described herein that are capable of dynamically failing over authentication traffic to a backup authentication system by a proxy system. An authentication request, which requests authentication of a principal, is received at the proxy system. The authentication request is directed to a primary authentication system. A determination is made, by the proxy system, that the primary authentication system is incapable of providing a valid response to the authentication request. The backup authentication system is caused, by the proxy system, to authenticate the principal using an authentication package received from the primary authentication system by dynamically routing the authentication request to the backup authentication system as a result of the primary authentication system being incapable of providing a valid response to the authentication request.

20 Claims, 9 Drawing Sheets

(56) References Cited

U.S. PATENT DOCUMENTS

| | | |
|---|---|---|
| 9,979,727 B2 | 5/2018 | Sakura et al. |
| 10,356,128 B1 | 7/2019 | Lango et al. |
| 10,360,366 B1 | 7/2019 | Dubey et al. |
| 10,362,007 B2 | 7/2019 | Hill |
| 10,509,914 B1 | 12/2019 | Desai et al. |
| 10,652,281 B1 | 5/2020 | Moolenaar et al. |
| 10,832,244 B1 | 11/2020 | Chowdhury |
| 10,972,465 B1 | 4/2021 | Bendersky et al. |
| 11,140,061 B1 | 10/2021 | Sanders et al. |
| 11,206,179 B1 | 12/2021 | Rathore et al. |
| 11,240,275 B1 | 2/2022 | Vashisht et al. |
| 11,256,573 B1 | 2/2022 | Ambaljeri et al. |
| 11,363,012 B1 | 6/2022 | Chhabra et al. |
| 11,574,035 B2 | 2/2023 | Singh et al. |
| 11,626,996 B2 | 4/2023 | Campagna et al. |
| 11,626,998 B2 | 4/2023 | Mozano et al. |
| 2003/0208681 A1* | 11/2003 | Muntz ............... G06F 21/6209 713/179 |
| 2005/0055552 A1 | 3/2005 | Shigeeda |
| 2007/0022469 A1 | 1/2007 | Cooper et al. |
| 2010/0011238 A1 | 1/2010 | Nakamura et al. |
| 2012/0054357 A1 | 3/2012 | Kuritzky et al. |
| 2012/0174198 A1 | 7/2012 | Gould et al. |
| 2012/0260322 A1 | 10/2012 | Logan et al. |
| 2013/0246796 A1 | 9/2013 | Lichtenstadt et al. |
| 2014/0181922 A1 | 6/2014 | Jakobsson |
| 2015/0288694 A1 | 10/2015 | Liebl et al. |
| 2016/0050272 A1 | 2/2016 | Raduchel |
| 2016/0191544 A1 | 6/2016 | Kim et al. |
| 2016/0381019 A1 | 12/2016 | Modi et al. |
| 2017/0006020 A1 | 1/2017 | Falodiya |
| 2017/0041963 A1 | 2/2017 | Edge |
| 2017/0201550 A1 | 7/2017 | Benson et al. |
| 2017/0279720 A1 | 9/2017 | Patnaik et al. |
| 2018/0041488 A1 | 2/2018 | Kohli |
| 2018/0152455 A1 | 5/2018 | Lee et al. |
| 2018/0234464 A1 | 8/2018 | Sim et al. |
| 2018/0278607 A1 | 9/2018 | Loladia et al. |
| 2018/0337920 A1 | 11/2018 | Stites et al. |
| 2018/0349581 A1 | 12/2018 | Ramalingam |
| 2019/0058700 A1 | 2/2019 | Kurian et al. |
| 2019/0069010 A1 | 2/2019 | Wang |
| 2019/0207937 A1 | 7/2019 | Neilan |
| 2019/0378142 A1* | 12/2019 | Darnell ................ H04L 9/3297 |
| 2020/0065427 A1 | 2/2020 | Tofighbakhsh |
| 2020/0177385 A1* | 6/2020 | Kumar .................... G06F 21/57 |
| 2020/0177589 A1 | 6/2020 | Mangalvedkar et al. |
| 2021/0021428 A1 | 1/2021 | Landman |
| 2021/0135869 A1 | 5/2021 | Barhudarian et al. |
| 2021/0136076 A1 | 5/2021 | Barhudarian et al. |
| 2021/0136114 A1 | 5/2021 | Barhudarian et al. |
| 2021/0141923 A1 | 5/2021 | Wu et al. |
| 2021/0167958 A1 | 6/2021 | Soriente et al. |
| 2021/0209079 A1 | 7/2021 | Lynch et al. |
| 2021/0226951 A1 | 7/2021 | Goldstein et al. |
| 2021/0226960 A1 | 7/2021 | Pattar et al. |
| 2021/0234850 A1 | 7/2021 | Vogt |
| 2021/0243038 A1* | 8/2021 | Wilson ................ H04L 9/3247 |
| 2021/0367938 A1 | 11/2021 | Praszczalek et al. |
| 2021/0374684 A1 | 12/2021 | Qiao et al. |
| 2021/0377044 A1 | 12/2021 | Leibmann et al. |
| 2022/0029820 A1* | 1/2022 | Mozano ................ H04L 9/0891 |
| 2022/0067712 A1 | 3/2022 | Sarin |
| 2022/0123950 A1 | 4/2022 | Erickson et al. |
| 2022/0141220 A1* | 5/2022 | Lind .................... H04L 63/0838 726/1 |
| 2022/0229933 A1 | 7/2022 | Lieb |
| 2022/0261487 A1 | 8/2022 | Lounsberry |
| 2022/0276848 A1 | 9/2022 | Garaev et al. |
| 2022/0309161 A1 | 9/2022 | Bhide et al. |
| 2022/0366038 A1 | 11/2022 | Summers et al. |
| 2022/0385646 A1* | 12/2022 | Basu ...................... H04L 63/20 |
| 2022/0385660 A1* | 12/2022 | Basu .................... H04L 63/0281 |
| 2023/0199025 A1* | 6/2023 | Xu ...................... H04L 63/0861 726/22 |

OTHER PUBLICATIONS

Singhal, et al., "Microsoft Identity Platform and OpenID Connect Protocol", Retrieved From: https://docs.microsoft.com/en-us/azure/active-directory/develop/v2-protocols-oidc#sample-request, May 22, 2020, 9 Pages.

"Notice of Allowance in U.S. Appl. No. 17/334,648", dated May 3, 2023, 15 Pages.

"Non Final Office Action Issued in U.S. Appl. No. 17/334,650", dated Aug. 31, 2023, 28 Pages.

* cited by examiner

PROXY CONFIGURED TO DYNAMICALLY FAILOVER AUTHENTICATION TRAFFIC TO A BACKUP AUTHENTICATION SYSTEM

BACKGROUND

Authentication of a principal (e.g., user or application) establishes truth of an assertion that an entity is the principal. For instance, such authentication of a principal often is a prerequisite for the principal to gain access to a resource (e.g., server resource) for a designated period of time. Authentication systems typically generate authentication artifacts (e.g., access tokens, identification (ID) tokens, and refresh tokens) that may be used to authenticate principals, and the authentication artifacts may designate the periods of time for which access to the resources is to be granted. During outages of the authentication systems, principals traditionally are not able to authenticate and maintain access to resources after expiration of their previously received authentication artifacts. For example, an authentication artifact typically is issued in real time when requested by a principal. If an authentication system that possesses a key that is used to issue authentication artifacts encounters an outage for even a moment, any principal that requests an authentication artifact in that moment traditionally will not receive the requested authentication artifact and will therefore be unable to access the resource for which authentication was sought.

SUMMARY

Various approaches are described herein for, among other things, dynamically failing over authentication traffic (e.g., authentication requests) to a backup authentication system by a proxy system. For example, authentication traffic that is directed toward a primary authentication system may be automatically re-directed to the backup authentication system by the proxy system based on one or more criteria. In accordance with this example, the authentication traffic may be automatically re-directed to the backup authentication system based on (e.g., based at least in part on) the primary authentication system not being capable of providing valid responses to authentication requests that are included in the authentication traffic. Dynamically failing over the authentication traffic to the backup authentication system may cause the backup authentication system to use an authentication package from the primary authentication system to authenticate principal(s) in response to authentication request(s) that are included in the authentication traffic.

In an example approach of dynamically failing over authentication traffic to a backup authentication system by a proxy system, an authentication request, which requests authentication of a principal, is received at the proxy system. The authentication request is directed to a primary authentication system. A determination is made, by the proxy system, that the primary authentication system is incapable of providing a valid response to the authentication request. The backup authentication system, which is isolated from the primary authentication system, is caused, by the proxy system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
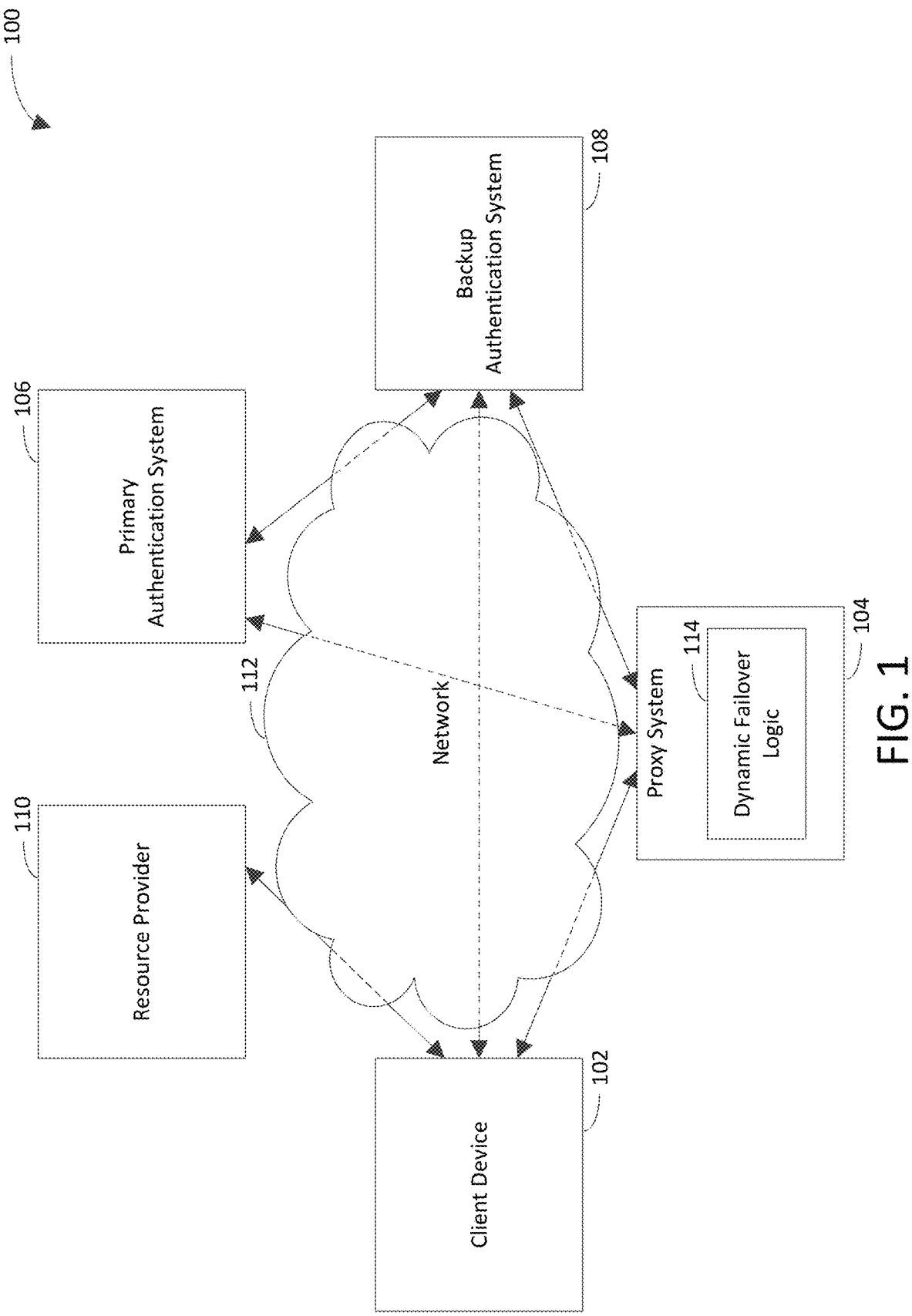
FIG. 1 is a block diagram of an example dynamic failover system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of dynamically failing over authentication traffic (e.g., authentication requests) to a backup authentication system by a proxy system. For example, authentication traffic that is directed toward a primary authentication system may be automatically re-directed to the backup authentication system by the proxy system based on one or more criteria. In accordance with this example, the authentication traffic may be automatically re-directed to the backup authentication system based on (e.g., based at least in part on) the primary authentication system not being capable of providing valid responses to authentication requests that are included in the authentication traffic. Dynamically failing over the authentication traffic to the backup authentication system may cause the backup authentication system to use an authentication package from the primary authentication system to authenticate principal(s) in response to authentication request(s) that are included in the authentication traffic.

Example techniques described herein have a variety of benefits as compared to conventional techniques for authenticating a principal. For instance, the example techniques may enable a principal to be authenticated even if a primary authentication system is not capable of providing a valid response to an authentication request. By dynamically failing over authentication traffic to a backup authentication system that stores an authentication artifact signed by the primary authentication system, availability and reliability of an authentication system that includes the primary authentication system and the backup authentication system may be increased. For instance, the example techniques may reduce a likelihood that the authentication system is to experience an outage. The backup authentication system may be isolated from the primary authentication system. For example, the primary authentication system and the backup authentication system may be hosted on different (e.g., separate) clouds and/or in different regions of the world.

The example techniques may reduce an amount of time and/or resources (e.g., processor cycles, memory, network bandwidth) that is consumed to obtain authentication of principals in a networked environment and/or to perform operations that rely on such authentication. For instance, by avoiding multiple attempts to authenticate a principal due to an outage of the authentication system, a computing system (e.g., a client device or the proxy system) may conserve the time and resources that would have been consumed by the computing system to execute the additional attempts. The example techniques may thereby reduce a cost associated with obtaining authentication of the principals and/or performing the operations that rely on the authentication.

The example techniques may increase speed and/or efficiency of a computing system by eliminating delays caused by a failure of an authentication system to provide a valid response to an authentication request provided by the computing system. The example techniques may improve (e.g., increase) a user experience and/or increase efficiency of a principal that seeks authentication for purposes of accessing a resource, for example, by more reliably providing such authentication. For instance, by more reliably providing authentication of the principal, an amount of the principal's time that would have been consumed to seek and obtain authentication may be reduced.

FIG. 1 is a block diagram of an example dynamic failover system 100 in accordance with an embodiment. Generally speaking, the dynamic failover system 100 operates to provide information to principals in response to requests (e.g., hypertext transfer protocol (HTTP) requests) that are received from the principals. For instance, a principal may be a user or an application. The information may include documents (Web pages, images, audio files, video files, etc.), output of executables, and/or any other suitable type of information. In accordance with example embodiments described herein, the dynamic failover system 100 enables a backup authentication system 108 to use an authentication package from a primary authentication system 106 to provide authentication services to principals even if the primary authentication system 106 is unable to provide valid responses to authentication requests from those principals.

As shown in FIG. 1, the dynamic failover system 100 includes a client device 102, a proxy system 104, the primary authentication system 106, the backup authentication system 108, a resource provider 110, and a network 112. Communication among the client device 102, the proxy system 104, the primary authentication system 106, the backup authentication system 108, and the resource provider 110 is carried out over the network 112 using well-known network communication protocols. The network 112 may be a wide-area network (e.g., the Internet), a local area network (LAN), another type of network, or a combination thereof.

The client device 102 is a processing system that is capable of communicating directly or indirectly with the proxy system 104, the primary authentication system 106, the backup authentication system 108, and the resource provider 110. An example of a processing system is a system that includes at least one processor that is capable of manipulating data in accordance with a set of instructions. For instance, a processing system may be a computer, a personal digital assistant, etc. The client device 102 is configured to provide authentication requests to the primary authentication system 106 and/or the backup authentication system 108 (e.g., via the proxy system 104) for requesting authentication artifacts that may be used to access resources provided by the resource provider 110. Examples of a resource include but are not limited to a document (Web page, image, audio file, video file, etc.) and an output of an executable. For instance, a user may initiate a request to access a resource (a.k.a. a resource request) using a client (e.g., a Web browser, Web crawler, or other type of client) deployed on the client device 102 that is owned by or otherwise accessible to the user. It will be recognized that the resource request need not necessarily be initiated by a user of the client device 102. For instance, the resource request may be initiated by an application that executes on the client device 102.

Regardless, when the client device 102 detects initiation of the resource request, the client device 102 may seek and obtain an authentication artifact (e.g., an ID token and/or an access token) from the primary authentication system 106 or the backup authentication system 108. For example, the client device 102 may provide credential(s) of the principal to the primary authentication system 106 or the backup authentication system 108 to obtain the authentication artifact. In accordance with this example, the client device 102 may receive the authentication artifact after the primary authentication system 106 or the backup authentication system 108 validates the identity and credential(s) of the principal. Upon receipt of the authentication artifact, the client device 102 may forward the authentication artifact to the resource provider 110 to gain access to the requested resource. In accordance with some example embodiments, the client device 102 is capable of accessing domains (e.g., Web sites) hosted by the resource provider 110, so that the client device 102 may access information that is available via the domains. Such domain may include Web pages, which may be provided as hypertext markup language (HTML) documents and objects (e.g., files) that are linked therein, for example.

The client device 102 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like.

Each of the proxy system 104, the primary authentication system 106, the backup authentication system 108, and the resource provider 110 is a processing system that is capable of communicating directly or indirectly with the client device 102. For instance, the primary authentication system 106 and the backup authentication system 108 may communicate with the client device 102 via the proxy system 104, as discussed in further detail below.

The proxy system 104 serves as an intermediary between the client device 102 and the primary authentication system 106 and between the client device 102 and the backup authentication system 108. The proxy system 104 may be any suitable type of proxy system. Example types of a proxy system include but are not limited to a reverse proxy system, a middle-of-the-network proxy system, and a forward proxy system. The proxy system 104 may be a break-and-inspect proxy system, which is capable of performing secure sockets layer (SSL) breaks.

The proxy system 104 includes dynamic failover logic 114. The dynamic failover logic 114 is configured to determine to which of the primary authentication system 106 and the backup authentication system 108 authentication traffic is to be directed. For instance, the dynamic failover logic 114 may intercept authentication requests that are sent from the client device 102 toward the primary authentication system 106 or from the client device 102 toward the backup authentication system 108. The dynamic failover logic 114 may forward each authentication request toward its intended destination (e.g., the primary authentication system 106 or the backup authentication system 108, as identified in the authentication request), or the proxy system 104 may route the authentication request to another destination (e.g., whichever of the primary authentication system 106 and the backup authentication system 108 is not identified in the authentication request), depending on circumstances.

In an example implementation, the dynamic failover logic 114 may be configured to route authentication requests to the primary authentication system 106 as a default destination. In accordance with this implementation, the dynamic failover logic 114 may be configured to route an authentication request to the backup authentication system 108 (e.g., rather than to the primary authentication system 106) based on (e.g., based at least in part on) the primary authentication system 106 being incapable of providing a valid response to the authentication request. The primary authentication system 106 may be incapable of providing a valid response to the authentication request for any of a variety of reasons, including but not limited to the primary authentication system 106 being inoperable or unreachable; a load of the primary authentication system 106 being greater than or equal to a load threshold; a dependency of the primary authentication system 106 that includes information (e.g., information about the principal) that is necessary for authentication being incapable of providing a valid response to a request for the information from the primary authentication system 106; performance of the primary authentication system 106 being less than or equal to a performance threshold (e.g., response time or delay being greater than or equal to a threshold); the primary authentication system 106 generating a designated error code; an engineer pressing a button to indicate that the primary authentication system 106 is incapable of providing a valid response to authentication requests; a criterion for establishing a connection between the proxy system 104 and the primary authentication system 106 not being satisfied; functionality of the primary authentication system 106 being blocked due to a security issue; a number of errors experienced by the primary authentication system 106 being greater than or equal to an error threshold; and the primary authentication system 106 being unreachable a number of times that is greater than or equal to a threshold number of times.

In another example implementation, the dynamic failover logic 114 is configured to receive an authentication request that is directed to the primary authentication system 106. The authentication request requests authentication of a principal. In accordance with this implementation, the dynamic failover logic 114 is further configured to determine whether the primary authentication system 106 is capable of providing a valid response to the authentication request. The dynamic failover logic 114 may be configured to cause the primary authentication system 106 to authenticate the principal by forwarding the authentication request to the primary authentication system 106 as a result of the primary authentication system 106 being capable of providing a valid response to the authentication request. The dynamic failover logic 114 may be configured to cause the backup authentication system 108 to authenticate the principal using an authentication package received from the primary authentication system 106 by dynamically routing the authentication request to the backup authentication system 108 as a result of the primary authentication system 106 being incapable of providing a valid response to the authentication request. For instance, the dynamic failover logic 114 may be configured to cause the backup authentication system 108 to authenticate the principal using the authentication package based at least in part on a first principal identifier in the authentication package that identifies the principal corresponding to (e.g., matching, being same as) a second principal identifier in the authentication request that identifies the principal and further based at least in part on a credential of the principal in the authentication request being verified using credential verification information in the authentication package that is usable to verify the credential.

The authentication package may include an authentication artifact and metadata. The dynamic failover logic 114 may be configured to cause the backup authentication system 108 to authenticate the principal using the metadata in the authentication package (e.g., based at least in part on a first principal identifier in the metadata that identifies the principal corresponding to a second principal identifier in the authentication request that identifies the principal and further based at least in part on a credential of the principal in the authentication request being verified using credential verification information in the authentication package that is usable to verify the credential). The dynamic failover logic 114 may receive the artifact from the backup authentication system 108 as a result of causing the backup authentication system 108 to authenticate the principal. The dynamic failover logic 114 may forward the artifact to the client device 104 so that the client device 104 may use the artifact to obtain access to a resource stored by the resource provider 110.

The dynamic failover logic 114 may be implemented in various ways to dynamically failover authentication traffic to the backup authentication system 108, including being implemented in hardware, software, firmware, or any combination thereof. For example, the dynamic failover logic 114 may be implemented as computer program code configured to be executed in one or more processors. In another example, at least a portion of the dynamic failover logic 114 may be implemented as hardware logic/electrical circuitry. For instance, at least a portion of the dynamic failover logic 114 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The primary authentication system 106 is configured to selectively provide authentication artifacts in response to authentication requests that are received by the primary authentication system 106 based on one or more criteria. For instance, the primary authentication system 106 may verify a credential of a principal that is included in an authentication request and compare a first principal identifier that is included in the authentication request and a second principal identifier that is associated with an authentication artifact to determine whether the authentication artifact is to be provided in response to the authentication request. The primary authentication system 106 may be configured to provide the authentication artifact based on the credential of the principal being verified and the first principal identifier corresponding to the second principal identifier. The primary authentication system 106 may be configured to not provide the authentication artifact based on the first principal identifier not corresponding to the second principal identifier.

The primary authentication system 106 is further configured to generate authentication package(s) to be provided to the backup authentication system 108. For instance, the primary authentication system 106 may provide an authentication package to the backup authentication system 108 while the primary authentication system 106 is capable of providing valid responses to authentication requests. The authentication package may enable the backup authentication system 108 to generate valid responses to authentication requests based on the primary authentication system 106 becoming unable to do so.

The authentication package (e.g., an authentication artifact therein) may be valid (e.g., usable by the backup authentication system 108 for purposes of authenticating the principal) for a designated period of time. Accordingly, the authentication package may expire at the end of the designated period of time. The primary authentication system 106 may periodically generate and provide new authentication packages to the backup authentication system 108. For instance, the primary authentication system 106 may provide each successive authentication package to the backup authentication system 108 prior to expiration of the preceding authentication package. This may ensure that the backup authentication system 108 continuously has a valid authentication package with which the backup authentication system 108 may authenticate the principal. For instance, the primary authentication system 106 may provide a new authentication package to the backup authentication system 108 at any suitable rate (e.g., once per day, no more frequently than once per day, or once every two days). Each new authentication package may be valid for any suitable period of time (e.g., two days, three days, or four days).

The backup authentication system 108 is configured to selectively provide authentication artifacts in response to authentication requests that are received by the backend authentication system 108 based on one or more criteria. For instance, the backend authentication system 108 may verify a credential of a principal that is included in an authentication request and compare a first principal identifier that is included in an authentication request and a second principal identifier that is associated with an authentication artifact to determine whether the authentication artifact is to be provided in response to the authentication request. The backend authentication system 108 may be configured to provide the authentication artifact based on the credential of the principal being verified and the first principal identifier corresponding to the second principal identifier. The backend authentication system 108 may be configured to not provide the authentication artifact based on the credential of the principal not being verified and/or the first principal identifier not corresponding to the second principal identifier.

The backup authentication system 108 is configured to store authentication package(s) that are received from the primary authentication system 106. Each authentication package may include an authentication artifact and metadata that is associated with the authentication artifact. The authentication artifact in each authentication package includes claim(s) that are usable to authenticate the principal that is identified by the metadata in the authentication package. Each authentication artifact may be signed with a cryptographic key by the primary authentication system 106. It should be noted that the primary authentication system 106 may be the only entity that is capable of signing authentication artifacts with the cryptographic key. For example, the backup authentication system 108 may not be capable of signing authentication artifacts with the cryptographic key. In accordance with this example, the backup authentication system 108 may not have access to the cryptographic key. It will be recognized that the backup authentication system 108 may perform security and validation checks on each authentication artifact to verify that the authentication artifact is not corrupted when it is received from the primary authentication system and that the authentication artifact is trustworthy to the principal.

In an example, the backup authentication system 108 may receive the authentication package(s) directly from the primary authentication system 106 (e.g., without being intercepted by another entity). In another example, the backup authentication system 108 may receive the authentication package(s) indirectly from the primary authentication system 106. In accordance with this example, the authentication package(s) may be received via the proxy system 104 or from a store in which the primary authentication system 106 stores the authentication package(s). Each of the authentication package(s) may be encrypted or unencrypted. For instance, any one or more of the authentication package(s)

may be encrypted with a public key of a key pair or with a symmetric key. The backup authentication system 108 may decrypt each authentication package that is encrypted with a public key of a key pair using a private key of the key pair. The backup authentication system 108 may decrypt each authentication package that is encrypted with a symmetric key using the symmetric key.

The backup authentication system 108 may be isolated from the primary authentication system 106, though the example embodiments are not limited in this respect. For example, the primary authentication system 106 and the backup authentication system 108 may be in different clouds and/or in different parts of the world. For instance, a cloud that hosts the primary authentication system 106 and a cloud that hosts the backup authentication system 108 may be decorrelated (e.g., have no reciprocal relationship). In another example, the cloud that hosts the primary authentication system 106 may be located (e.g., contained) in a first geographical region, and the cloud that hosts the backup authentication system 108 may be located in a second geographical region that is different from the first geographical region. For instance, the first and second geographical regions may be first and second continents, first and second countries, first and second states, first and second counties, or first and second cities.

The primary authentication system 106 and the backup authentication system 108 may be incorporated into a cloud computing service, though the scope of the example embodiments is not limited in this respect. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc.

The resource provider 110 is configured to selectively provide access to a resource depending on whether a requisite authentication artifact is received by the resource provider 110. For instance, the resource provider 110 may receive a request to access the resource from the client device 102. The request may include an authentication artifact that the client device received from the primary authentication system 106 or the backup authentication system 108. The resource provider 110 may verify the authentication artifact (e.g., decrypt the authentication artifact or compare the authentication artifact to a reference authentication artifact to determine that the client device 102 is to be granted access to the resource). The resource provider 110 may be configured to grant the client device 102 access to the resource based on the authentication artifact being verified. The resource provider 110 may be configured to deny the client device 102 access to the resource based on the authentication artifact not being verified.

FIGS. 2-8 depict flowcharts 200, 300, 400, 500, 600, 700, and 800 of example methods for dynamically failing over authentication traffic to a backup authentication system by a proxy system in accordance with embodiments. Flowcharts 200, 300, 400, 500, 600, 700, and 800 may be performed by the proxy system 104 shown in FIG. 1, for example. For illustrative purposes, flowcharts 200, 300, 400, 500, 600, 700, and 800 are described with respect to proxy system 900 shown in FIG. 9, which is an example implementation of the proxy system 104. As shown in FIG. 9, the proxy system 900 includes dynamic failover logic 914 and a store 916. The dynamic failover logic 914 includes capability determination logic 902, dynamic routing logic 904, duplication logic 906, policy review logic 908, testing logic 910, and load monitoring logic 912. The store 916 may be any suitable type of store. One type of store is a database. For instance, the store 916 may be a relational database, an entity-relationship database, an object database, an object relational database, an extensible markup language (XML) database, etc. The store 916 is shown to store an authentication policy 930. Further structural and operational embodiments will be apparent to persons skilled in the relevant art(s) based on the discussion regarding flowcharts 200, 300, 400, 500, 600, 700, and 800.

Figure 2:
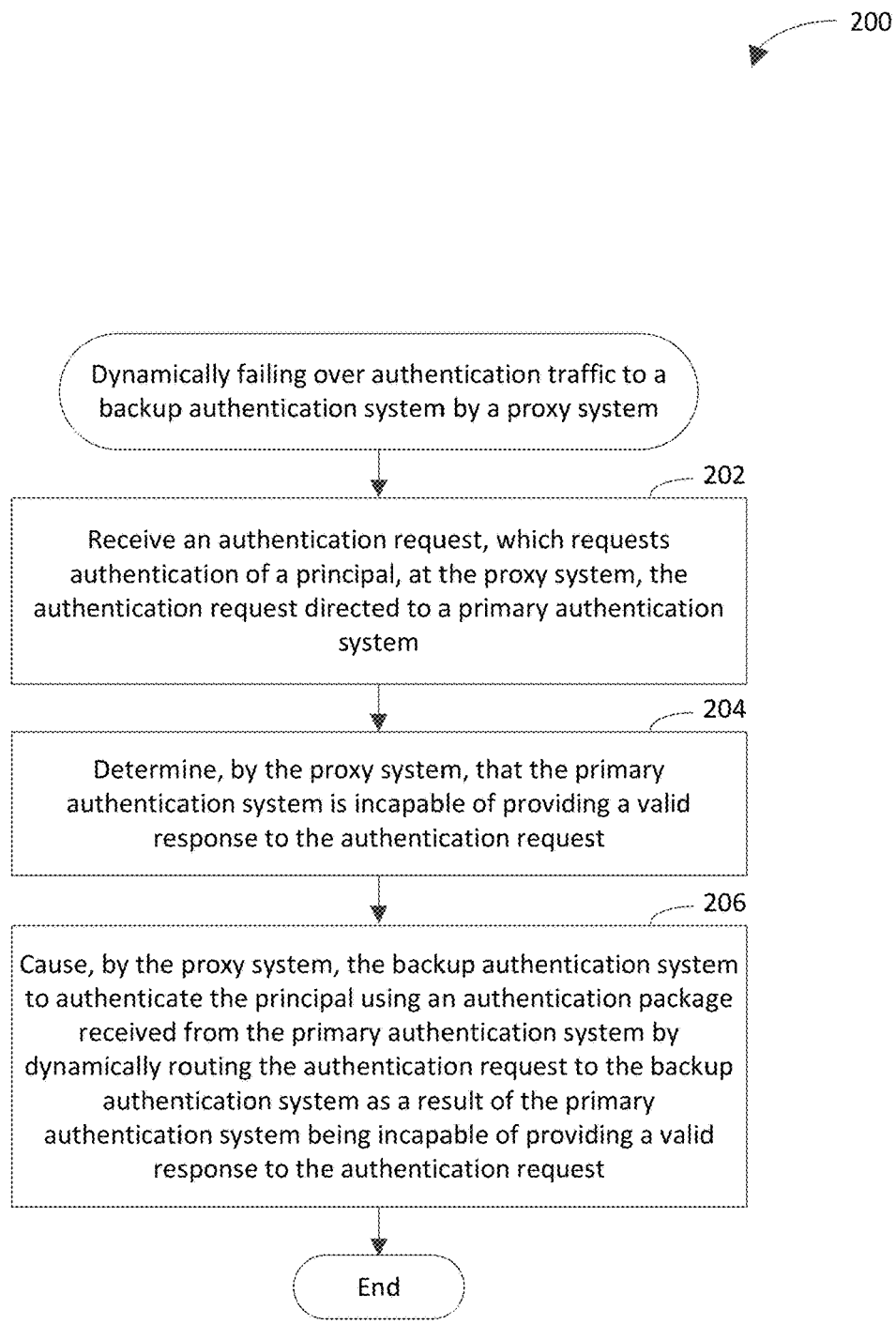
FIGS. 2-8 depict flowcharts of example methods for dynamically failing over authentication traffic to a backup authentication system by a proxy system in accordance with embodiments.

As shown in FIG. 2, the method of flowchart 200 begins at step 202. In step 202, an authentication request, which requests authentication of a principal, is received at the proxy system. The principal may be any suitable entity that is capable of identifying itself. For instance, the principal may be a user (e.g., a user of the client device 102), an application (e.g., an application that executes on the client device 102), or a computing device (e.g., the client device 102). The authentication request is directed to a primary authentication system. For instance, the authentication request may specify the primary authentication system as a recipient of the authentication request.

The authentication request includes a credential of the principal and a second principal identifier. The credential of the principal may be any suitable type of credential, including but not limited to a biometric-based credential, a behaviometric-based credential, a knowledge-based credential, and an ownership-based credential. A biometric-based credential is a measurement or calculation of a physiological characteristic of a user. Examples of a physiological characteristic of a user include but are not limited to a face, hand, palm veins, palmprint, fingerprint, DNA, iris, and retina of the user. A measurement or calculation of a characteristic may indicate one or more dimensions of the characteristic (e.g., one or more dimensions of a feature of the characteristic or a spacing between multiple features of the characteristic). For instance, if a physiological characteristic of a user is the user's fingerprint, the biometric-based credential associated with the user's fingerprint may include a mapping of the ridges in the fingerprint. A behaviometric-based credential is a credential that indicates a pattern of behavior of a user. Examples of a pattern of behavior of a user include but are not limited to a voice, gait, and pattern of key press intervals (a.k.a. typing rhythm) of the user. A knowledge-based credential is something a user knows. Examples of a knowledge-based credential include but are not limited to a password or a portion thereof, pass phrase, personal identification number (PIN), challenge response, and security question. An ownership-based credential is a credential obtained from something a user has. Examples of something the user has (or may have) include but are not limited to a smartcard, wrist band, ID card, security token, device implanted under the user's skin, software token, cell phone (having a built-in hardware token or storing a software token), and hardware authentication device (e.g., YubiKey®). The credential may be issued to the principal by the primary authentication system. The credential may be encrypted and/or cryptographically signed (e.g., tamper-proof) by the primary authentication system, though the scope of the example embodiments is not limited in this respect. The second principal identifier identifies the principal.

The authentication request may include a single communication or multiple communications. For example, the credential of the principal and the second principal identifier may be received simultaneously by the proxy system in a single communication. For instance, the credential may include the second principal identifier (e.g., an encrypted version of the second principal identifier). In another example, the credential of the principal and the second principal identifier may be received in separate communications. In accordance with this example, a first communication from the principal may include the second principal identifier. In further accordance with this example, an inquiry may be provided to the principal (e.g., via a user interface), requesting the credential as a result of the first communication being received. For instance, the inquiry may be forwarded from the backup authentication system to the principal by the proxy system. In further accordance with this example, the proxy system may receive a second communication that includes the credential from the principal in response to the inquiry.

In an example implementation, the capability determination logic 902 and the dynamic routing logic 904 receive an authentication request 918, which requests authentication of the principal. For instance, if the principal is a user, the capability determination logic 902 may receive the authentication request 918 from a client device that is owned or otherwise accessible to the principal. If the principal is an application, the capability determination logic 902 may receive the authentication request 918 from a client device on which the principal executes.

At step 204, a determination is made, by the proxy system, that the primary authentication system is incapable of providing a valid (e.g., error-free) response to the authentication request. For instance, the determination may be made automatically in response to receiving the authentication request. In an example implementation, the capability logic 902 determines that the primary authentication system is incapable of providing a valid response to the authentication request 918. The capability logic 902 may determine that the primary authentication system is incapable of providing a valid response to the authentication request 918 based on (e.g., based at least in part on) any of a variety of factors, including but not limited to the primary authentication system being inoperable or unreachable; a load of the primary authentication system being greater than or equal to a load threshold; a dependency of the primary authentication system that includes information (e.g., information about the principal) that is necessary for authentication being incapable of providing a valid response to a request for the information from the primary authentication system; performance of the primary authentication system being less than or equal to a performance threshold (e.g., response time or delay being greater than or equal to a threshold); the primary authentication system generating a designated error code; an engineer pressing a button to indicate that the primary authentication system is incapable of providing a valid response to authentication requests; a criterion for establishing a connection between the proxy system 900 and the primary authentication system not being satisfied; functionality of the primary authentication system being blocked due to a security issue; a number of errors experienced by the primary authentication system being greater than or equal to an error threshold; and the primary authentication system being unreachable a number of times that is greater than or equal to a threshold number of times.

In an example, the capability determination logic 902 may make the determination that the primary authentication system is incapable of providing a valid response to the authentication request 918 based on information that is stored in the store 916 prior to receipt of the authentication request. In accordance with this example, the information may indicate that the primary authentication system is incapable of providing a valid response to the authentication request 918. In another example, the capability determination logic 902 may make the determination based on the authentication request 918 being sent from the proxy system 900 to the primary authentication system and no valid response to the authentication request 918 being received at the proxy system 900 (e.g., within a designated period of time) from the primary authentication system. The capability determination logic 902 may generate a capability indicator 926, which indicates that the primary authentication system is incapable of providing a valid response to the authentication request 918, as a result of the determination.

In an example embodiment, determining that the primary authentication system is incapable of providing a valid response to the authentication request at step 204 includes providing the authentication request to the primary authentication system by the proxy system based at least in part on the authentication request being directed to the primary authentication system. In accordance with this embodiment, determining that the primary authentication system is incapable of providing a valid response to the authentication request at step 204 further includes not receiving a valid response to the authentication request at the proxy system from the primary authentication system. For instance, a valid response may not be received at the proxy system from the primary authentication system within a designated amount of time that begins at a time instance at which the authentication request is provided to the primary authentication system by the proxy system.

In another example embodiment, determining that the primary authentication system is incapable of providing a valid response to the authentication request at step 204 includes storing information, which indicates that the primary authentication system is incapable of providing a valid response to the authentication request, by the proxy system prior to receipt of the authentication request at the proxy system. For instance, the capability determination logic 902 may store the information in the store 916 prior to receipt of the authentication request 918 at the capability determination logic 902. In accordance with this embodiment, determining that the primary authentication system is incapable of providing a valid response to the authentication request at step 204 further includes reviewing the information by the proxy system to determine that the primary authentication system is incapable of providing a valid response to the authentication request. For instance, the capability determination logic 902 may review the information to make the determination.

At step 206, the backup authentication system is caused, by the proxy system, to authenticate the principal using an authentication package received from the primary authentication system by dynamically routing the authentication request to the backup authentication system (e.g., rather than to the primary authentication system) as a result of the primary authentication system being incapable of providing a valid response to the authentication request. The authentication package includes a first principal identifier and credential verification information. The first principal identifier identifies the principal. The credential verification information is usable to verify the credential of the principal. The backup authentication system is caused, by the proxy system, to authenticate the principal at step 206 based at least in part on the first principal identifier in the authentication package corresponding to the second principal identifier in the authentication request and further based at least in part on the credential of the principal in the authentication request being verified using the credential verification information in the authentication package. The backup authentication system may be isolated from the primary authentication system. In an example implementation, the dynamic routing logic 904 causes the backup authentication system to authenticate the principal using an authentication package received from the primary authentication system by dynamically routing the authentication request 918 to the backup authentication system as a result of the primary authentication system being incapable of providing a valid response to the authentication request 918.

The credential of the principal may be verified using the credential verification information in any of a variety of ways. For example, the credential may be an encrypted credential (e.g., refresh token or password). In an aspect of this example, the credential verification information may include a key that is configured to decrypt the encrypted credential. In another aspect of this example, the credential verification information may include a description of the credential, which enables the backup authentication system to identify the key that is to be used to decrypt the encrypted credential. In further accordance with this example, the credential of the principal may be verified by decrypting the encrypted credential with the key that is included in the credential verification information or that is identified based on the credential verification information to reveal the unencrypted credential. In an example embodiment, the key that is used to decrypt the encrypted credential is possessed by only the primary authentication system and the backup authentication system. In accordance with this embodiment, only the primary authentication system and the backup authentication system are capable of using the key to decrypt the encrypted credential.

In another example, the credential may be an encrypted version of the second principal identifier (e.g., refresh token or password). In an aspect of this example, the credential verification information may include a key that is configured to decrypt the encrypted version of the second principal identifier. In another aspect of this example, the credential verification information may include a description of the second principal identifier, which enables the backup authentication system to identify the key that is to be used to decrypt the encrypted version of the second principal identifier. In further accordance with this example, the credential of the principal may be verified by decrypting the encrypted version of the second principal identifier with the key that is included in the credential verification information or that is identified based on the credential verification information to reveal the second principal identifier. The key that is used to decrypt the encrypted version of the second principal identifier may be possessed by only the primary and backup authentication systems such that only the primary and backup authentication systems are capable of using the key to decrypt the encrypted version of the second principal identifier, though the scope of the example embodiments is not limited in this respect.

In an example embodiment, the keys described in the examples above are usable by the backup authentication system for purposes of decryption and not for purposes of encryption. In accordance with this embodiment, the backup authentication system is not able to generate its own version of a credential using a key that is usable to decrypt an encrypted version of the credential. In another example embodiment, the keys described in the examples above are usable by the backup authentication system for purposes of decryption and for purposes of encryption. In accordance with this embodiment, the backup authentication system is able to generate its own version of a credential using a key that is usable to decrypt an encrypted version of the credential.

In yet another example, the credential of the principal may be a hashed credential (e.g., refresh token or password). In accordance with this example, the credential verification information may include a hash of the credential (or the credential that is then hashed by the backend authentication system to provide the hashed credential). Accordingly, the credential of the principal may be verified by comparing the hashed credential in the authentication request to the hashed credential that is included in or derived from the credential verification information to confirm that the aforementioned hashed credentials are same.

In an example embodiment, the authentication package includes an authentication artifact. The authentication artifact is signed with a cryptographic key that belongs to the primary authentication system. For instance, the authentication artifact may be signed with the cryptographic key by the primary authentication system. The authentication artifact includes one or more claims that are usable to authenticate the principal. For instance, the authentication artifact may indicate an identity of the principal and/or an access permission of the principal. An access permission of the principal indicates whether the principal is authorized to perform an action (e.g., access, modify, delete) with regard to a resource. The authentication artifact may be an authentication token, a security assertion markup language (SAML) assertion, etc. that is generated by the primary authentication system based on (e.g., using) a cryptographic key. For example, the cryptographic key on which the authentication artifact is based may be controlled by the primary authentication system. In accordance with this example, the cryptographic key may be owned by or under exclusive control of the primary authentication system. The cryptographic key on which the authentication artifact is based and the cryptographic key with which the authentication artifact is signed may be same or different. Any one or more of the claim(s) in the authentication artifact may be configured to enable (e.g., trigger) authentication of the principal.

In accordance with this embodiment, the authentication package further includes metadata associated with the authentication artifact. The metadata includes the credential verification information, which is usable to verify the credential of the principal. For instance, the credential verification information may identify the credential of the principal in a secure manner and include enough information to enable the backup authentication system to verify the credential. The metadata further includes the first principal identifier that identifies the principal. For instance, the first principal identifier may be a username of the principal or a token that is issued to the principal by the primary authentication system. The metadata may indicate what the authentication artifact is, what the authentication artifact contains, how the authentication artifact is to be stored, a lifetime (e.g., duration of usability or effectiveness) of the authentication artifact, and so on. The authentication package may be signed with a second cryptographic key by the primary authentication system and/or encrypted by the primary authentication system.

In another example embodiment, causing the backup authentication system to authenticate the principal at step 206 is performed in accordance with a federated identity protocol. Examples of a federated identity protocol include but are not limited to an OAuth 2.0 protocol, an Open ID Connect (OIDC) protocol, a SAML protocol, a Web Services Federation (WS-Federation) protocol, and a WS-Trust protocol.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes testing, by the proxy system, a response of the backup authentication system to a simulated outage of the primary authentication system over a period of time while the primary authentication system is capable of providing valid responses to authentication requests by routing the authentication requests, which are directed to the primary authentication system, to the backup authentication system (e.g., rather than to the primary authentication system) during the period of time. In an example implementation, the testing logic 910 tests the response of the backup authentication system to the simulated outage of the primary authentication system over the period of time by routing the authentication requests to the backup authentication system.

For example, the testing logic 910 may test the response of the backup authentication system by reviewing system response information 936. The system response information 936 may include response(s) to any one or more (e.g., all) of the authentication requests that are routed to the backup authentication system. Accordingly, the response(s) may be provided (e.g., generated) by the backup authentication system. The system response information 936 not including a response to an authentication request may indicate that the backup authentication system is unable to provide a response to the authentication request. The testing logic 910 may make a determination regarding the response of the backup authentication system to the simulated outage of the primary authentication system based on whether a response is not received to any of the authentication requests and whether any one or more of the responses that are received are valid or invalid. The determination may include a likelihood of the backup authentication system to fail during a real-world outage of the primary authentication system, an indication of types of issues that may be encountered by the backup authentication system during such an outage, and so on.

In another example embodiment, dynamically routing the authentication request to the backup authentication system at step 206 includes notifying the backup authentication system that the authentication request is sent from the proxy system. In an example implementation, the dynamic routing logic 904 notifies the backup authentication system that the authentication request 918 is sent from the proxy system 900. In an internet protocol (IP) address example, the authentication request 918 may include an IP address of the proxy system 900. For instance, the dynamic routing logic 904 may add the IP address of the proxy system 900 to the authentication request 918 prior to forwarding the authentication request 918 to the backup authentication system. It will be recognized that the IP address of the proxy system 900 being incorporated into the authentication request 918 may indicate that the authentication request 918 is sent from the proxy system 900. In accordance with this embodiment, the method of flowchart 200 further includes receiving a response to the authentication request from the backup authentication system at the proxy system based at least in part on the backup authentication system being notified that the authentication request is sent from the proxy system. For example, the authentication request being sent from the proxy system may be a prerequisite for receiving the response to the authentication request. In accordance with this example, the backup authentication system may not provide the response if the authentication request is not sent from the proxy system. In an example implementation, the dynamic routing logic 904 receives a response 934 to the authentication request 918 from the backup authentication system based at least in part on the backup authentication system being notified that the authentication request 918 is sent from the proxy system 900. In the IP address example mentioned above, the dynamic routing logic 904 may receive the response 934 to the authentication request 918 based at least in part on the IP address in the authentication request 918 corresponding to a reference IP address associated with the proxy system 900.

In an aspect of this embodiment, dynamically routing the authentication request to the backup authentication system at step 206 includes notifying the backup authentication system of a reason that the authentication request is sent from the proxy system. In an example implementation, the dynamic routing logic 904 notifies the backup authentication system of a reason that the authentication request 918 is sent from the proxy system 900. In accordance with this embodiment, receiving the response to the authentication request is further based at least in part on the reason corresponding to a reference reason.

Figure 3:
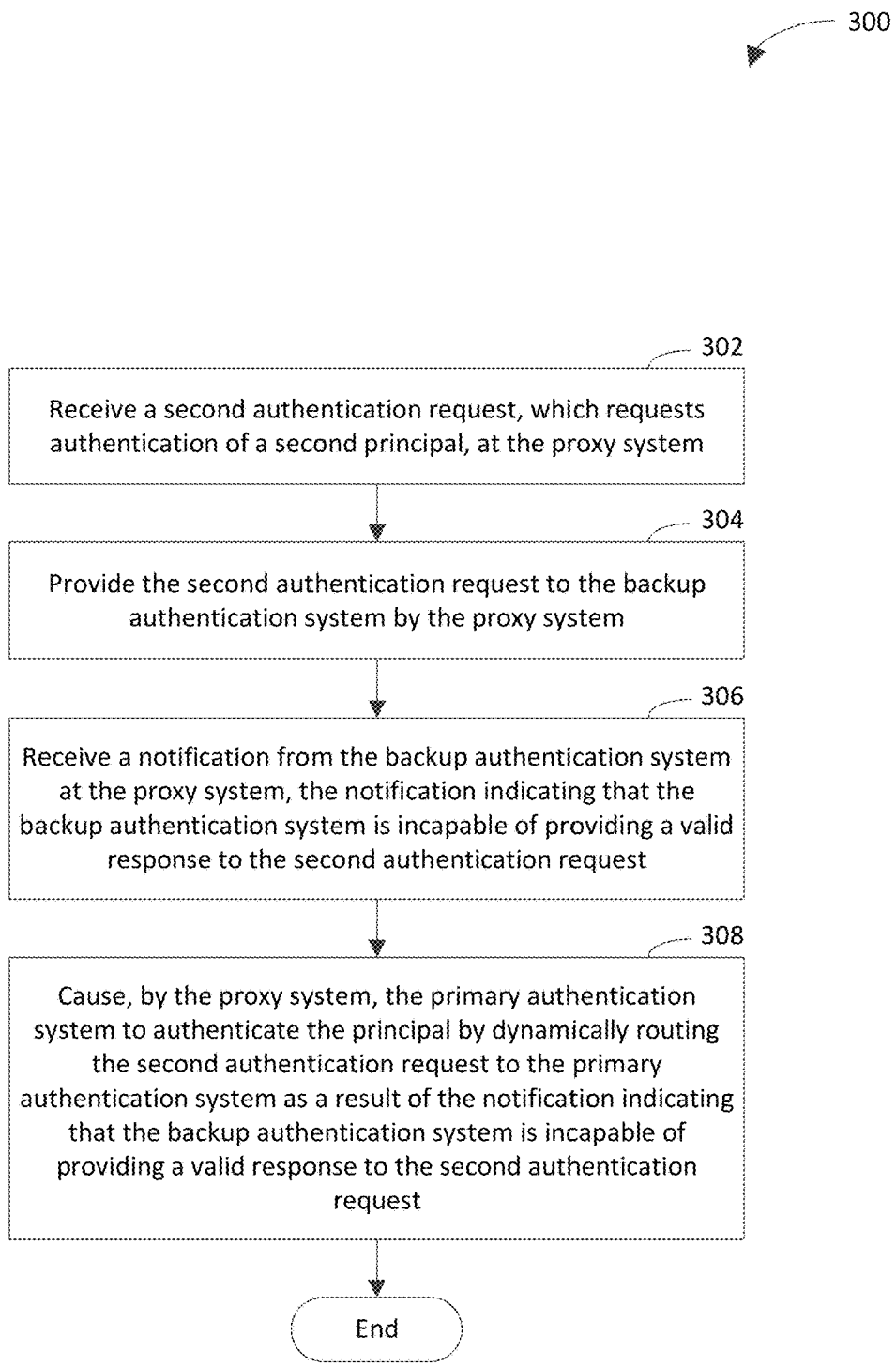

In yet another example embodiment, the method of flowchart 200 further includes one or more of the steps shown in flowchart 300 of FIG. 3. As shown in FIG. 3, the method of flowchart 300 begins at step 302. In step 302, a second authentication request, which requests authentication of a second principal, is received at the proxy system. In an example implementation, the dynamic routing logic 904 receives the second authentication request.

At step 304, the second authentication request is provided to the backup authentication system by the proxy system. For example, the second authentication request may be provided to the backup authentication system based at least in part on the second authentication request being directed to the backup authentication system. In accordance with this example, the second authentication request may include an IP address of the backup authentication system. In an example implementation, the dynamic routing logic 904 provides the second authentication request to the backup authentication system.

At step 306, a notification is received from the backup authentication system at the proxy system. The notification indicates that the backup authentication system is incapable of providing a valid response to the second authentication request. In an example implementation, the capability determination logic 902 receives a capability notification 932 from the backup authentication system. In accordance with this implementation, the capability determination logic 902 indicates that the backup authentication system is incapable of providing a valid response to the second authentication request. The capability determination logic 902 may generate a capability indicator 926 to indicate that the backup authentication system is incapable of providing a valid response to the second authentication request.

At step 308, the primary authentication system is cause, by the proxy system, to authenticate the principal by dynamically routing the second authentication request to the primary authentication system as a result of the notification indicating that the backup authentication system is incapable of providing a valid response to the second authentication request. In an example implementation, the dynamic routing logic 904 causes the primary authentication system to authenticate the principal by dynamically routing the second authentication request to the primary authentication system as a result of the capability notification 932 indicating that the backup authentication system is incapable of providing a valid response to the second authentication request.

Figure 4:
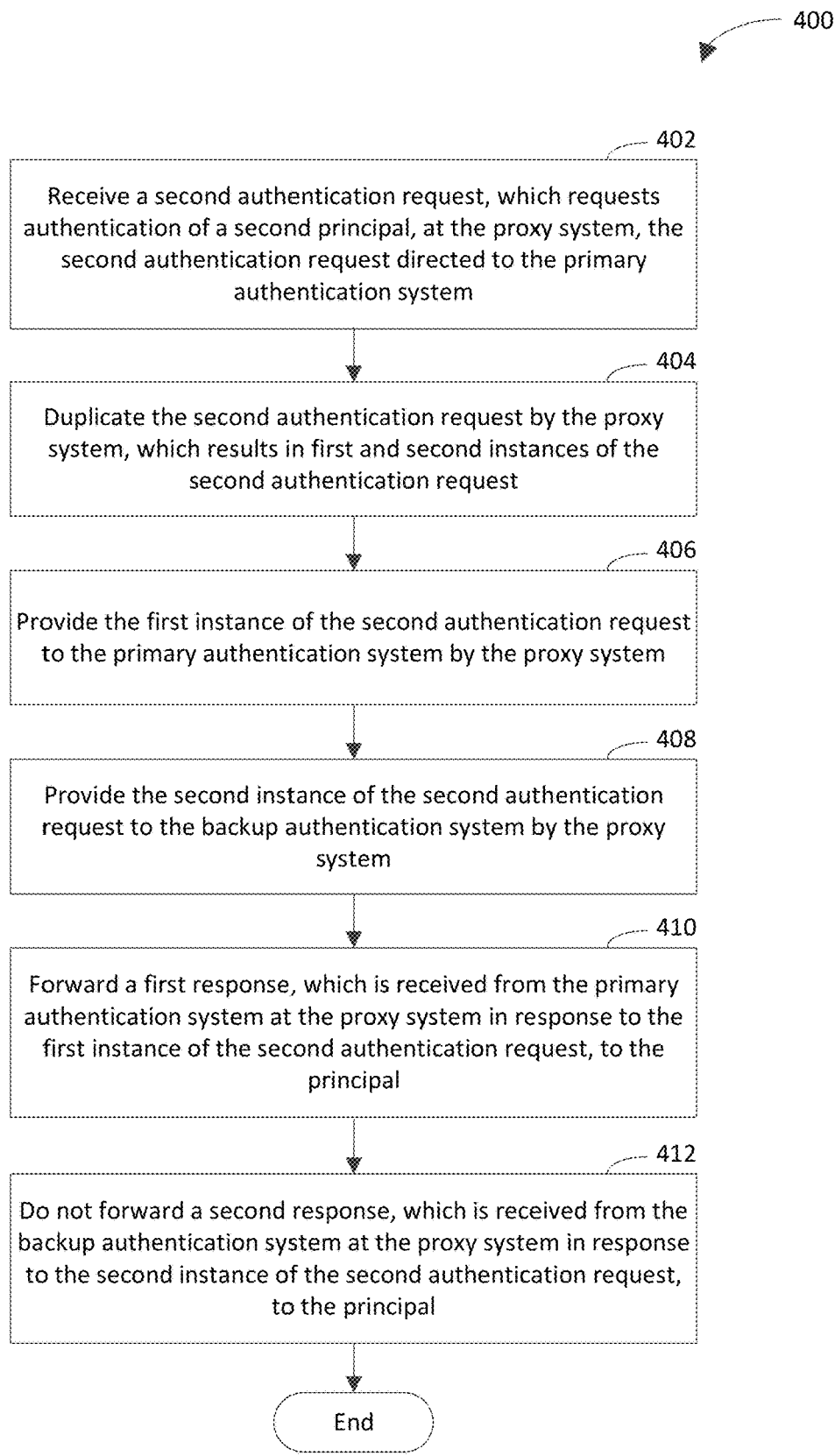

In still another example embodiment, the method of flowchart 200 further includes one or more of the steps shown in flowchart 400 of FIG. 4. As shown in FIG. 4, the method of flowchart 400 begins at step 402. In step 402, a second authentication request, which requests authentication of a second principal, is received at the proxy system. The second authentication request is directed to the primary authentication system. The first principal and the second principal may be same or different. In an example implementation, the dynamic routing logic 904 receives the second authentication request.

At step 404, the second authentication request is duplicated by the proxy system, which results in first and second instances of the second authentication request. In an example implementation, the duplication logic 906 duplicates the second authentication request to result in the first and second instances of the second authentication request. For instance, the dynamic routing logic 904 may generate a duplication instruction 928 in response to receipt of the second authentication request. The duplication logic 906 may duplicate the second authentication request based on receipt of the duplication instruction 928. The duplication logic 906 may provide requested instances 920, including the first and second instances of the second authentication request, to the dynamic routing logic 904.

At step 406, the first instance of the second authentication request is provided to the primary authentication system by the proxy system. In an example implementation, the dynamic routing logic 904 provides the first instance of the second authentication request to the primary authentication system.

At step 408, the second instance of the second authentication request is provided to the backup authentication system by the proxy system. In an example implementation, the dynamic routing logic 904 provides the second instance of the second authentication request to the backup authentication system.

At step 410, a first response, which is received from the primary authentication system at the proxy system in response to the first instance of the second authentication request, is forwarded to the principal. In an example implementation, the dynamic routing logic 904 forwards the first response to the principal.

At step 412, a second response, which is received from the backup authentication system at the proxy system in response to the second instance of the second authentication request, is not forwarded to the principal. In an example implementation, the dynamic routing logic 904 does not forward the second response to the principal. For instance, the dynamic routing logic 904 may log the second response and then dismiss (e.g., delete or disregard) the second response. Analysis of the second response and any other responses received from the backup authentication system may indicate whether routing of authentication requests to the backup authentication system causes regression. The dynamic routing logic 904 may enable the primary authentication system to compare the first and second responses by forwarding the second response to the primary authentication system. It will be recognized that responses from the backup authentication system may be analyzed remotely through telemetry.

Figure 5:
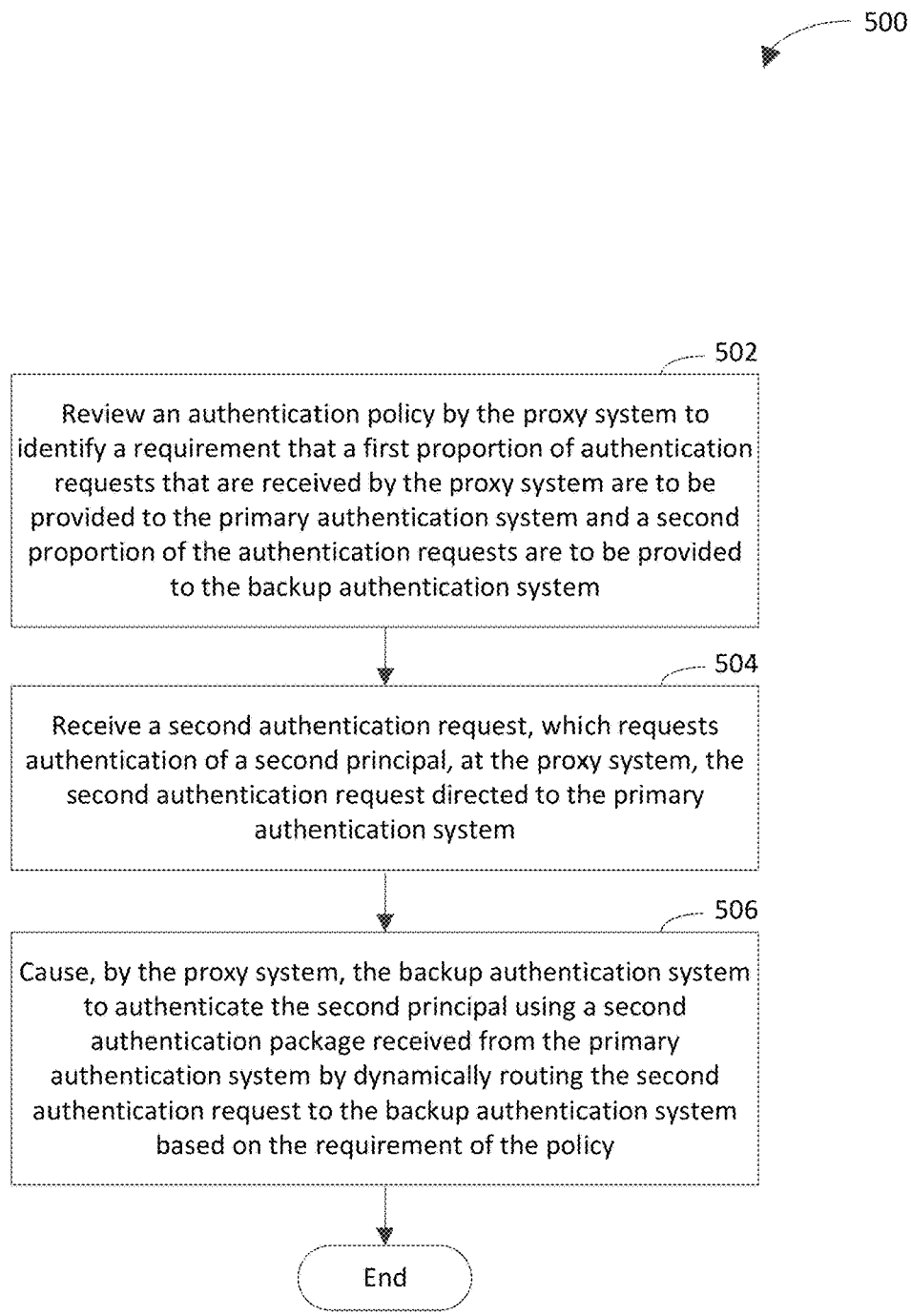

In another example embodiment, the method of flowchart 200 further includes one or more of the steps shown in flowchart 500 of FIG. 5. As shown in FIG. 5, the method of flowchart 500 begins at step 502. In step 502, an authentication policy is reviewed by the proxy system to identify a requirement that a first proportion of authentication requests that are received by the proxy system are to be provided to the primary authentication system and a second proportion of the authentication requests are to be provided to the backup authentication system. In an example implementation, the policy review logic 908 reviews the authentication policy 930 to identify the requirement. The policy review logic 908 may generate policy information 922 in response to reviewing the authentication policy 930. For instance, the policy information 922 may indicate that a first proportion of authentication requests that are received by the proxy system 900 are to be provided to the primary authentication system and a second proportion of the authentication requests are to be provided to the backup authentication system.

At step 504, a second authentication request, which requests authentication of a second principal, is received at the proxy system. The second authentication request is directed to the primary authentication system. The first principal and the second principal may be same or different. In an example implementation, the dynamic routing logic 904 receives the second authentication request.

At step 506, the backup authentication system is caused, by the proxy system, to authenticate the second principal using a second authentication package received from the primary authentication system by dynamically routing the second authentication request to the backup authentication system based on the requirement of the authentication policy. For instance, the authentication of the second principal may be based at least in part on a principal identifier in the second authentication package that identifies the second principal corresponding to a principal identifier in the second authentication request that identifies the second principal and further based at least in part on a second credential of the second principal in the second authentication request being verified using second credential verification information in the second authentication package that is usable to verify the second credential. In an example implementation, the dynamic routing logic 904 causes the backup authentication system to authenticate the second principal using the second authentication package by dynamically routing the second authentication request to the backup authentication system based on the requirement of the authentication policy 930. For instance, the dynamic routing logic 904 may dynamically route the second authentication request to the backup authentication system to comply with the requirement of the authentication policy 930. The dynamic routing logic 904 may causes the backup authentication system to authenticate the second principal using the second authentication package based on receipt of the policy information 922 (e.g., based on the policy information 922 indicating that the first proportion of authentication requests that are received by the proxy system 900 are to be provided to the primary authentication system and the second proportion of the authentication requests are to be provided to the backup authentication system).

Figure 6:
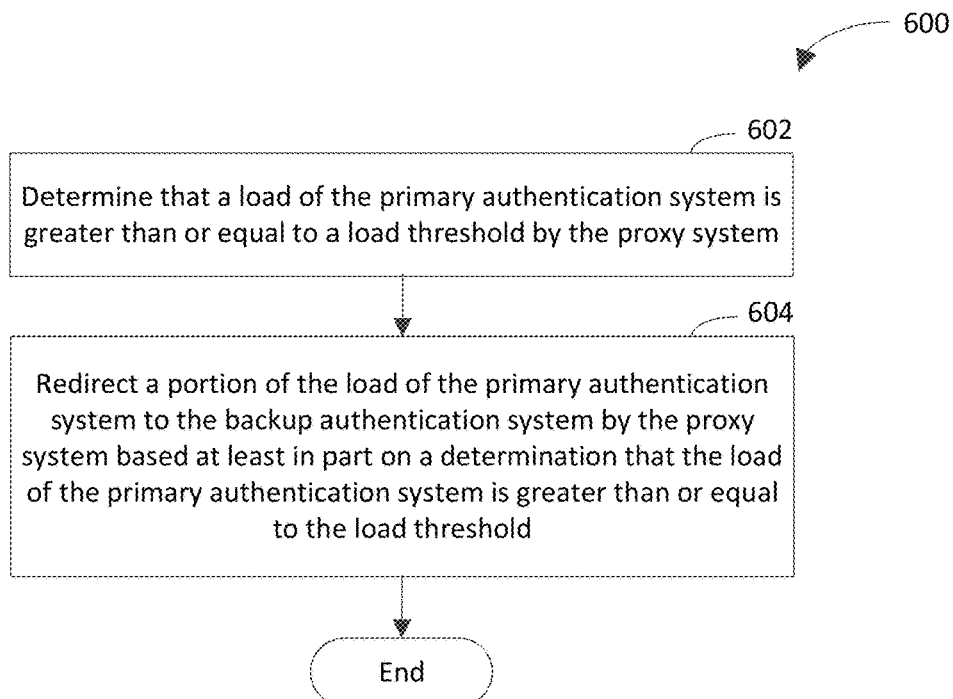

In yet another example embodiment, the method of flowchart 200 further includes one or more of the steps shown in flowchart 600 of FIG. 6. As shown in FIG. 6, the method of flowchart 600 begins at step 602. In step 602, a determination is made that a load of the primary authentication system is greater than or equal to a load threshold by the proxy system. For instance, the load of the primary authentication system may be based on a number of authentication requests that have been handled by the primary authentication system, a number of authentication requests received by the primary authentication system per unit of time, or a number of authentication requests in queue to be handled by the primary authentication system. In an example implementation, the load monitoring logic 912 determines that the load of the primary authentication system is greater than or equal to the load threshold. For example, the load monitoring logic 912 may make the determination based on performance information 938. In accordance with this example, the performance information 938 may include primary authentication system load information, which indicates the load of the primary authentication system. For instance, the load monitoring logic 912 may receive the primary authentication system load information from the primary authentication system. In accordance with this implementation, the load monitoring logic 912 may compare the load of the primary authentication system, as indicated by the performance information 938, and the load threshold to determine that the load of the primary authentication system is greater than or equal to the load threshold. The load monitoring logic 912 may generate a redirection instruction 924 based on the load of the primary authentication system being greater than or equal to the load threshold. For instance, the load of the primary authentication system being greater than or equal to the load threshold may trigger the load monitoring logic 912 to generate the redirection instruction 924. The redirection instruction 924 may instruct the dynamic routing logic 904 to redirect a portion of the load of the primary authentication system to the backup authentication system.

At step 604, a portion of the load of the primary authentication system is redirected to the backup authentication system by the proxy system based at least in part on a determination that the load of the primary authentication system is greater than or equal to the load threshold. In an example implementation, the dynamic routing logic 904 redirects the portion of the load of the primary authentication system to the backup authentication system. For instance, the dynamic routing logic 904 may redirect the portion of the load of the primary authentication system to the backup authentication system based on receipt of the redirection instruction 924.

Figure 7:
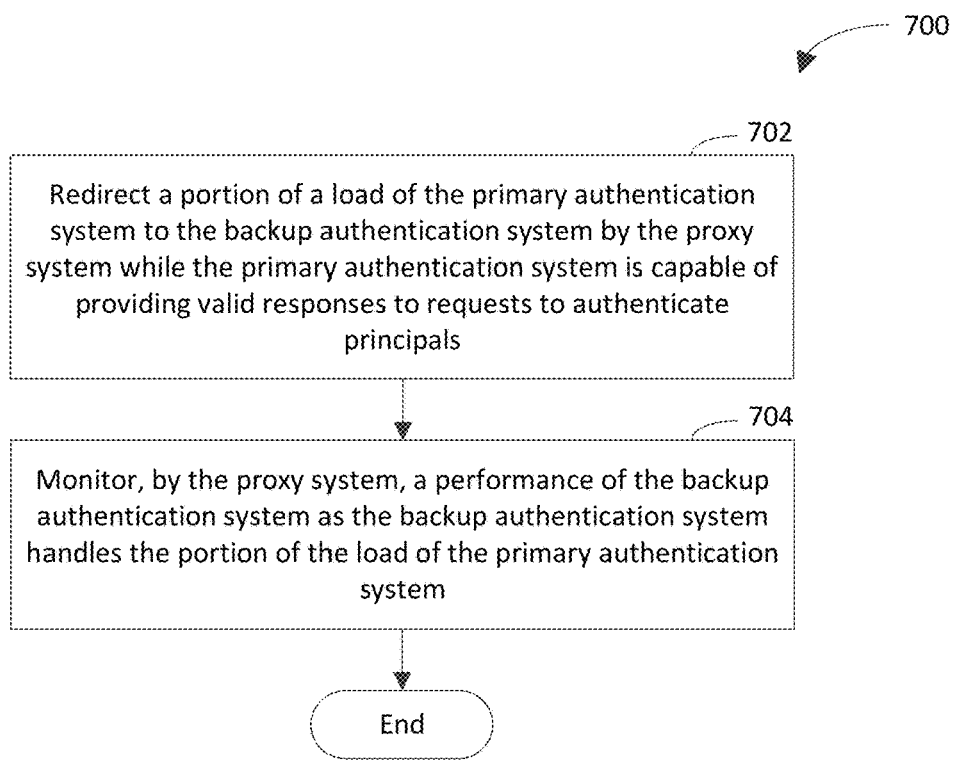

In still another example embodiment, the method of flowchart 200 further includes one or more of the steps shown in flowchart 700 of FIG. 7. As shown in FIG. 7, the method of flowchart 700 begins at step 702. In step 702, a portion of a load of the primary authentication system is redirected to the backup authentication system by the proxy system while the primary authentication system is capable of providing valid responses to requests to authenticate principals. In an example implementation, the dynamic routing logic 904 redirects the portion of the load of the primary authentication system to the backup authentication system while the primary authentication system is capable of providing valid responses to requests to authenticate principals.

At step 704, a performance of the backup authentication system is monitored, by the proxy system, as the backup authentication system handles the portion of the load of the primary authentication system. In an example implementation, the load monitoring logic 912 monitors the performance of the backup authentication system as the backup authentication system handles the portion of the load of the primary authentication system. For instance, the load monitoring logic 912 may review the performance information 938, which indicates the performance of the backup authentication system, to determine whether the backup authentication system is capable of handling the portion of the load or an extent to which the backup authentication system is capable of handling the portion of the load. The performance information 938 may be updated on a continuous basis to reflect changes in the performance of the backup authentication system in real-time.

Figure 8:
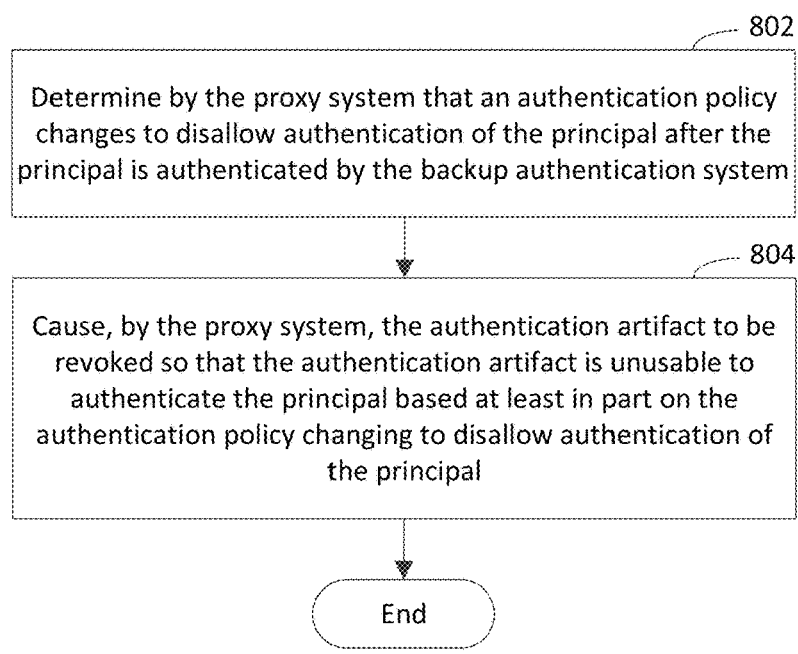
Figure 9:
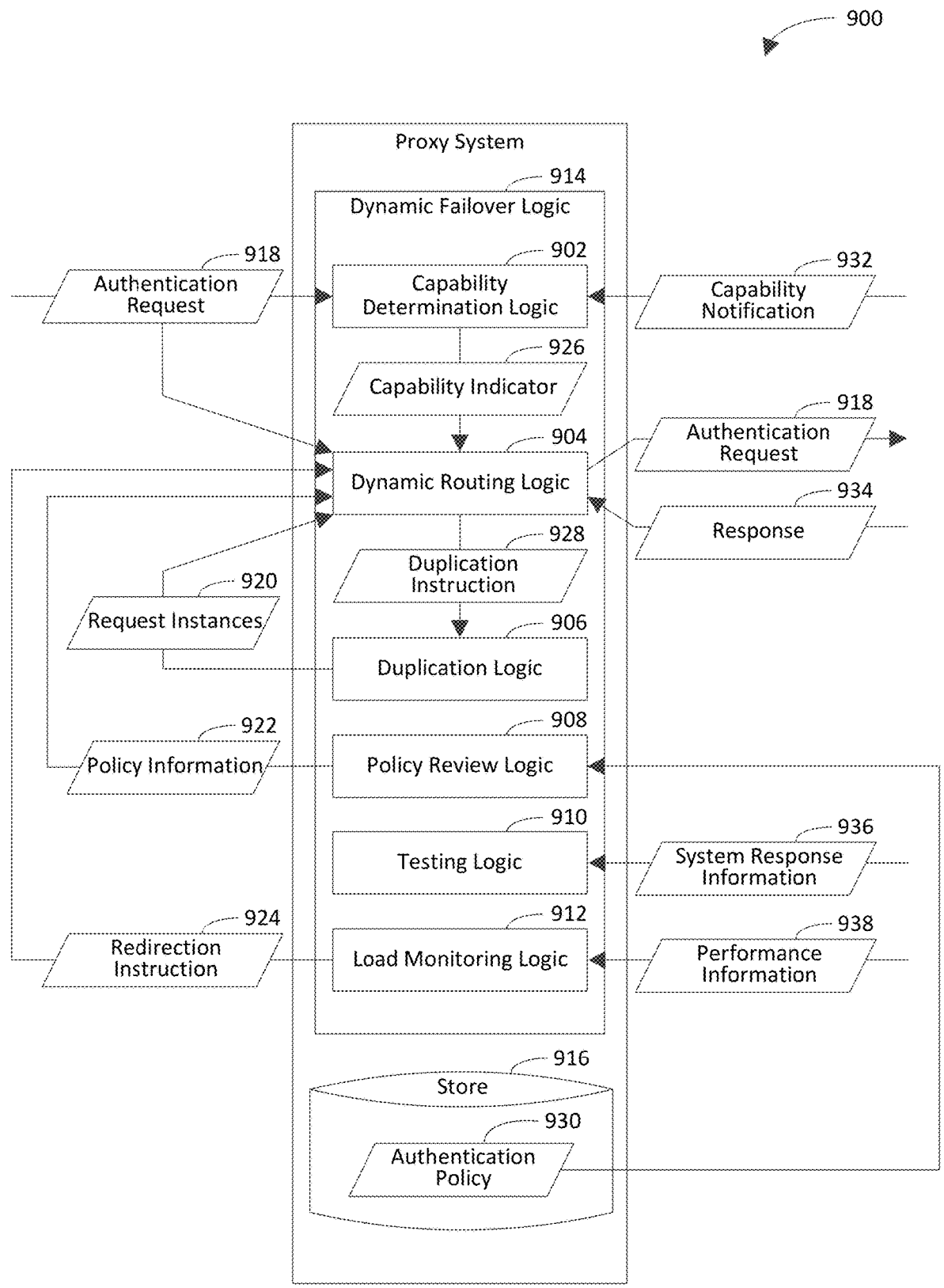
FIG. 9 is a block diagram of an example proxy system in accordance with an embodiment.

In still another example embodiment, the method of flowchart 200 further includes one or more of the steps shown in flowchart 800 of FIG. 8. As shown in FIG. 8, the method of flowchart 800 begins at step 802. In step 802, a determination is made by the proxy system that an authentication policy changes to disallow authentication of the principal after the principal is authenticated by the backup authentication system. In an employment example, the principal's employment with an organization may terminate after the principal has been authenticated. An information technology (IT) administrator of the organization may update the authentication policy to reflect that the principal is no longer authorized to be authenticated. In an example implementation, the policy review logic 908 determines that the authentication policy 930 changes to disallow authentication of the principal after the principal is authenticated by the backup authentication system.

At step 804, the authentication artifact is caused to be revoked so that the authentication artifact is unusable to authenticate the principal based at least in part on the authentication policy changing to disallow authentication of the principal. In the employment example mentioned above, the authentication artifact is caused to be revoked so that the principal cannot be authenticated (e.g., and therefore cannot access resources of the organization that require authentication) after the principal's employment with the organization has terminated. In an example implementation, the policy review logic 908 and/or the dynamic routing logic 904 causes the authentication artifact to be revoked so that the authentication artifact is unusable to authenticate the principal based at least in part on the authentication policy 930 changing to disallow authentication of the principal. For example, the policy review logic 908 may generate policy information 922, indicating that the authentication policy 930 has changed to disallow authentication of the principal. In accordance with this example, the dynamic routing logic 904 may revoke the authentication artifact based on the policy information 922 indicating that the authentication policy 930 has changed to disallow authentication of the principal.

It will be recognized that the proxy system 900 may not include one or more of the capability determination logic 902, the dynamic routing logic 904, the duplication logic 906, the policy review logic 908, the testing logic 910, and/or the load monitoring logic 912. Furthermore, the proxy system 900 may include components in addition to or in lieu of the capability determination logic 902, the dynamic routing logic 904, the duplication logic 906, the policy review logic 908, the testing logic 910, and/or the load monitoring logic 912.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the dynamic failover logic 114, the capability determination logic 902, the dynamic routing logic 904, the duplication logic 906, the policy review logic 908, the testing logic 910, the load monitoring logic 912, the dynamic failover logic 914, flowchart 200, flowchart 300, flowchart 400, flowchart 500, flowchart 600, flowchart 700, and/or flowchart 800 may be implemented in hardware, software, firmware, or any combination thereof.

For example, any one or more of the dynamic failover logic 114, the capability determination logic 902, the dynamic routing logic 904, the duplication logic 906, the policy review logic 908, the testing logic 910, the load monitoring logic 912, the dynamic failover logic 914, flowchart 200, flowchart 300, flowchart 400, flowchart 500, flowchart 600, flowchart 700, and/or flowchart 800 may be implemented, at least in part, as computer program code configured to be executed in one or more processors.

In another example, any one or more of the dynamic failover logic 114, the capability determination logic 902, the dynamic routing logic 904, the duplication logic 906, the policy review logic 908, the testing logic 910, the load monitoring logic 912, the dynamic failover logic 914, flowchart 200, flowchart 300, flowchart 400, flowchart 500, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
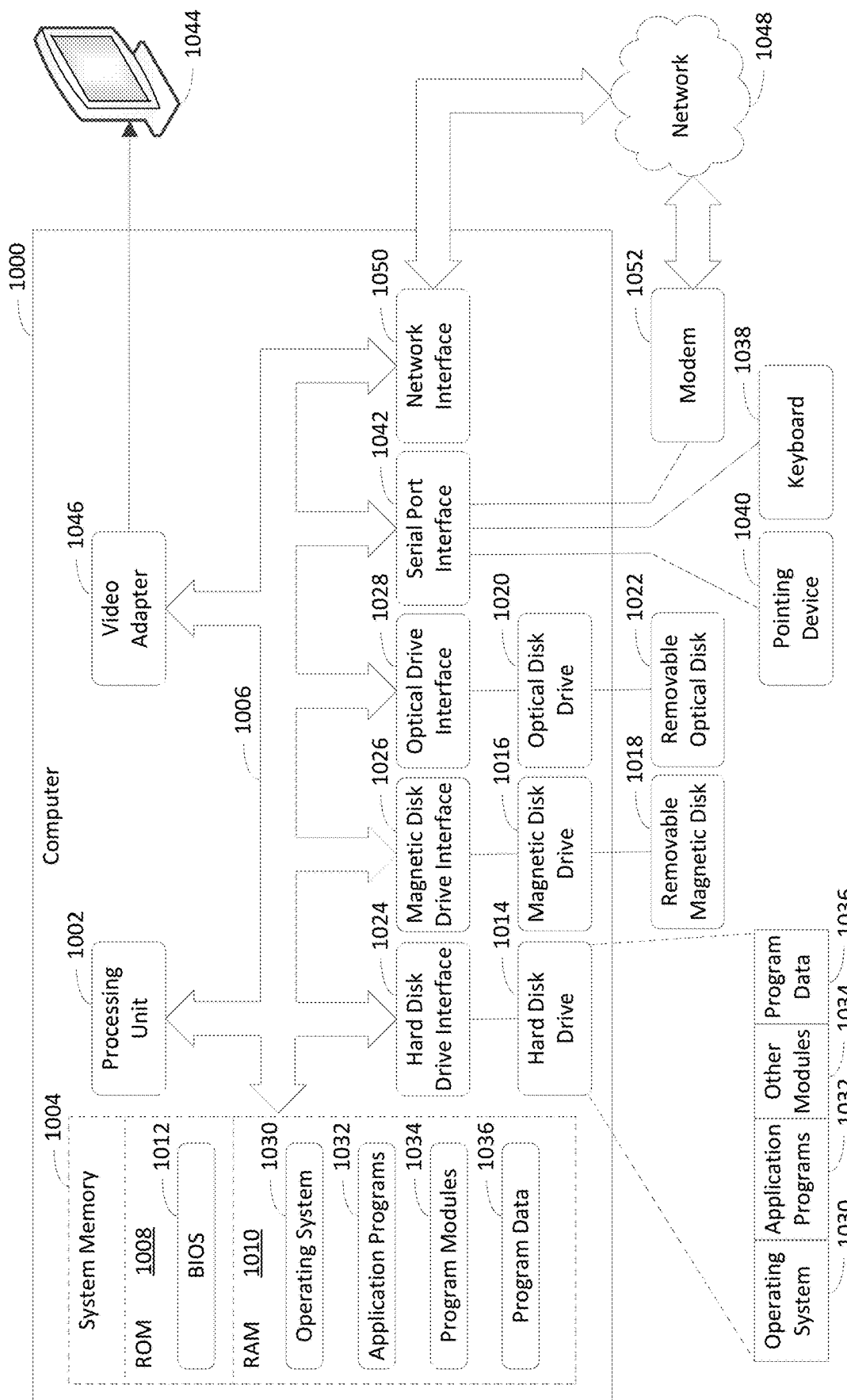
FIG. 10 depicts an example computer in which embodiments may be implemented.

III. Further Discussion of Some Example Embodiments (A1) An example proxy system (FIG. 1, 104; FIG. 9, 900; FIG. 10, 1000) to dynamically failover authentication traffic to a backup authentication system (FIG. 1, 108) comprises a memory (FIG. 10, 1004, 1008, 1010) and one or more processors (FIG. 10, 1002) coupled to the memory. The one or more processors are configured to determine (FIG. 2, 204) that a primary authentication system (FIG. 1, 106) is incapable of providing a valid response (FIG. 9, 934) to an authentication request (FIG. 9, 918), which is directed to the primary authentication system and which requests authentication of a principal. The one or more processors are further configured to cause (FIG. 2, 206) the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

(A2) In the example proxy system of A1, wherein the authentication package includes an authentication artifact and metadata associated with the authentication artifact; wherein the authentication artifact is signed with a cryptographic key belonging to the primary authentication system; wherein the authentication artifact includes one or more claims that are usable to authenticate the principal; and wherein the metadata includes the first principal identifier and the credential verification information.

(A3) In the example proxy system of any of A1-A2, wherein the one or more processors are configured to determine that the primary authentication system is incapable of providing a valid response to the authentication request by performing the following operations: providing the authentication request to the primary authentication system based at least in part on the authentication request being directed to the primary authentication system; and not receiving a valid response to the authentication request from the primary authentication system.

(A4) In the example proxy system of any of A1-A3, wherein the one or more processors are configured to determine that the primary authentication system is incapable of providing a valid response to the authentication request by performing the following operations: storing information, which indicates that the primary authentication system is incapable of providing a valid response to the authentication request, by the proxy system prior to receipt of the authentication request at the proxy system; and reviewing the information by the proxy system to determine that the primary authentication system is incapable of providing a valid response to the authentication request.

(A5) In the example proxy system of any of A1-A4, wherein the one or more processors are further configured to: receive a second authentication request, which requests authentication of a second principal; provide the second authentication request to the backup authentication system; receive a notification from the backup authentication system, the notification indicating that the backup authentication system is incapable of providing a valid response to the second authentication request; and cause the primary authentication system to authenticate the principal by dynamically routing the second authentication request to the primary authentication system as a result of the notification indicating that the backup authentication system is incapable of providing a valid response to the second authentication request.

(A6) In the example proxy system of any of A1-A5, wherein the one or more processors are further configured to: receive a second authentication request, which requests authentication of a second principal, the second authentication request directed to the primary authentication system; duplicate the second authentication request, which results in first and second instances of the second authentication request; provide the first instance of the second authentication request to the primary authentication system; provide the second instance of the second authentication request to the backup authentication system; forward a first response, which is received from the primary authentication system in response to the first instance of the second authentication request, to the principal; and not forward a second response, which is received from the backup authentication system in response to the second instance of the second authentication request, to the principal.

(A7) In the example proxy system of any of A1-A6, wherein the one or more processors are further configured to: review an authentication policy to identify a requirement that a first proportion of authentication requests that are received by the proxy system are to be provided to the primary authentication system and a second proportion of the authentication requests are to be provided to the backup authentication system; receive a second authentication request, which requests authentication of a second principal, the second authentication request directed to the primary authentication system; and cause the backup authentication system to authenticate the second principal using a second authentication package received from the primary authentication system, based at least in part on a principal identifier in the second authentication package that identifies the second principal corresponding to a principal identifier in the second authentication request that identifies the second principal and further based at least in part on a second credential of the second principal in the second authentication request being verified using second credential verification information in the second authentication package that is usable to verify the second credential, by dynamically routing the second authentication request to the backup authentication system based on the requirement of the authentication policy.

(A8) In the example proxy system of any of A1-A7, wherein the one or more processors are further configured to: test a response of the backup authentication system to a simulated outage of the primary authentication system over a period of time while the primary authentication system is capable of providing valid responses to authentication requests by routing the authentication requests, which are directed to the primary authentication system, to the backup authentication system during the period of time.

(A9) In the example proxy system of any of A1-A8, wherein the one or more processors are configured to: notify the backup authentication system that the authentication request is sent from the proxy system; and receive a response to the authentication request from the backup authentication system based at least in part on the backup authentication system being notified that the authentication request is sent from the proxy system.

(A10) In the example proxy system of any of A1-A9, wherein the one or more processors are configured to: notify the backup authentication system of a reason that the authentication request is sent from the proxy system; and receive the response to the authentication request from the backup authentication system further based at least in part on the reason corresponding to a reference reason.

(A11) In the example proxy system of any of A1-A10, wherein the one or more processors are configured to: cause the backup authentication system to authenticate the principal in accordance with a federated identity protocol.

(A12) In the example proxy system of any of A1-A11, wherein the one or more processors are further configured to: determine that a load of the primary authentication system is greater than or equal to a load threshold; and redirect a portion of the load of the primary authentication system to the backup authentication system based at least in part on a determination that the load of the primary authentication system is greater than or equal to the load threshold.

(A13) In the example proxy system of any of A1-A12, wherein the one or more processors are further configured to: redirect a portion of a load of the primary authentication system to the backup authentication system while the primary authentication system is capable of providing valid responses to requests to authenticate principals; and monitor a performance of the backup authentication system as the backup authentication system handles the portion of the load of the primary authentication system.

(A14) In the example proxy system of any of A1-A13, wherein the one or more processors are further configured to: determine that an authentication policy changes to disallow authentication of the principal after the principal is authenticated by the backup authentication system; and cause the authentication artifact to be revoked so that the authentication artifact is unusable to authenticate the principal based at least in part on the authentication policy changing to disallow authentication of the principal.

(B1) An example method of dynamically failing over authentication traffic to a backup authentication system (FIG. 1, 108) by a proxy system (FIG. 1, 104; FIG. 9, 900; FIG. 10, 1000) comprises receiving (FIG. 2, 202) an authentication request (FIG. 9, 918), which requests authentication of a principal, at the proxy system. The authentication request is directed to a primary authentication system (FIG. 1, 106). The method further comprises determining (FIG. 2, 204), by the proxy system, that the primary authentication system is incapable of providing a valid response (FIG. 9, 934) to the authentication request. The method further comprises causing (FIG. 2, 206), by the proxy system, the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

(B2) In the method of B1, wherein the authentication package includes an authentication artifact and metadata associated with the authentication artifact; wherein the authentication artifact is signed with a cryptographic key belonging to the primary authentication system; wherein the authentication artifact includes one or more claims that are usable to authenticate the principal; and wherein the metadata includes the first principal identifier and the credential verification information.

(B3) In the method of any of B1-B2, wherein determining that the primary authentication system is incapable of providing a valid response to the authentication request comprises: providing the authentication request to the primary authentication system by the proxy system based at least in part on the authentication request being directed to the primary authentication system; and not receiving a valid response to the authentication request at the proxy system from the primary authentication system.

(B4) In the method of any of B1-B3, wherein determining that the primary authentication system is incapable of providing a valid response to the authentication request comprises: storing information, which indicates that the primary authentication system is incapable of providing a valid response to the authentication request, by the proxy system prior to receipt of the authentication request at the proxy system; and reviewing the information by the proxy system to determine that the primary authentication system is incapable of providing a valid response to the authentication request.

(B5) In the method of any of B1-B4, further comprising: receiving a second authentication request, which requests authentication of a second principal, at the proxy system; providing the second authentication request to the backup authentication system by the proxy system; receiving a notification from the backup authentication system at the proxy system, the notification indicating that the backup authentication system is incapable of providing a valid response to the second authentication request; and causing, by the proxy system, the primary authentication system to authenticate the principal by dynamically routing the second authentication request to the primary authentication system as a result of the notification indicating that the backup authentication system is incapable of providing a valid response to the second authentication request.

(B6) In the method of any of B1-B5, further comprising: receiving a second authentication request, which requests authentication of a second principal, at the proxy system, the second authentication request directed to the primary authentication system; duplicating the second authentication request by the proxy system, which results in first and second instances of the second authentication request; providing the first instance of the second authentication request to the primary authentication system by the proxy system; providing the second instance of the second authentication request to the backup authentication system by the proxy system; forwarding a first response, which is received from the primary authentication system at the proxy system in response to the first instance of the second authentication request, to the principal; and not forwarding a second response, which is received from the backup authentication system at the proxy system in response to the second instance of the second authentication request, to the principal.

(B7) In the method of any of B1-B6, further comprising: reviewing an authentication policy by the proxy system to identify a requirement that a first proportion of authentication requests that are received by the proxy system are to be provided to the primary authentication system and a second proportion of the authentication requests are to be provided to the backup authentication system; receiving a second authentication request, which requests authentication of a second principal, at the proxy system, the second authentication request directed to the primary authentication system; and causing, by the proxy system, the backup authentication system to authenticate the second principal using a second authentication package received from the primary authentication system, based at least in part on a principal identifier in the second authentication package that identifies the second principal corresponding to a principal identifier in the second authentication request that identifies the second principal and further based at least in part on a second credential of the second principal in the second authentication request being verified using second credential verification information in the second authentication package that is usable to verify the second credential, by dynamically routing the second authentication request to the backup authentication system based on the requirement of the authentication policy.

(B8) In the method of any of B1-B7, further comprising: testing, by the proxy system, a response of the backup authentication system to a simulated outage of the primary authentication system over a period of time while the primary authentication system is capable of providing valid responses to authentication requests by routing the authentication requests, which are directed to the primary authentication system, to the backup authentication system during the period of time.

(B9) In the method of any of B1-B8, wherein dynamically routing the authentication request to the backup authentication system comprises: notifying the backup authentication system that the authentication request is sent from the proxy system; and wherein the method further comprises: receiving a response to the authentication request from the backup authentication system at the proxy system based at least in part on the backup authentication system being notified that the authentication request is sent from the proxy system.

(B10) In the method of any of B1-B9, wherein dynamically routing the authentication request to the backup authentication system comprises: notifying the backup authentication system of a reason that the authentication request is sent from the proxy system; and wherein receiving the response to the authentication request comprises: receiving the response to the authentication request from the backup authentication system at the proxy system further based at least in part on the reason corresponding to a reference reason.

(B11) In the method of any of B1-B10, wherein causing the backup authentication system to authenticate the principal comprises: causing, by the proxy system, the backup authentication system to authenticate the principal in accordance with a federated identity protocol.

(B12) In the method of any of B1-B11, further comprising: determining that a load of the primary authentication system is greater than or equal to a load threshold by the proxy system; and redirecting a portion of the load of the primary authentication system to the backup authentication system by the proxy system based at least in part on a determination that the load of the primary authentication system is greater than or equal to the load threshold.

(B13) In the method of any of B1-B12, further comprising: redirecting a portion of a load of the primary authentication system to the backup authentication system by the proxy system while the primary authentication system is capable of providing valid responses to requests to authenticate principals; and monitoring, by the proxy system, a performance of the backup authentication system as the backup authentication system handles the portion of the load of the primary authentication system.

(B14) In the method of any of B1-B13, further comprising: determining by the proxy system that an authentication policy changes to disallow authentication of the principal after the principal is authenticated by the backup authentication system; and causing, by the proxy system, the authentication artifact to be revoked so that the authentication artifact is unusable to authenticate the principal based at least in part on the authentication policy changing to disallow authentication of the principal.

(C1) An example computer program product (FIG. 10, 1018, 1022) comprising a computer-readable storage medium having instructions recorded thereon for enabling a processor-based proxy system (FIG. 1, 104; FIG. 9, 900; FIG. 10, 1000) to dynamically failover authentication traffic to a backup authentication system (FIG. 1, 108) by performing operations, the operations comprise: determining (FIG. 2, 204) that a primary authentication system (FIG. 1, 106) is incapable of providing a valid response (FIG. 9, 934) to an authentication request (FIG. 9, 918), which is directed to the primary authentication system and which requests authentication of a principal; and causing (FIG. 2, 206) the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

IV. Example Computer System

FIG. 10 depicts an example computer 1000 in which embodiments may be implemented. Any one or more of the client device 102, the proxy system 104, the primary authentication system 106, the backup authentication system 108, and/or the resource provider 110 show in FIG. 1 and/or the proxy system 900 shown in FIG. 9 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the dynamic failover logic 114, the capability determination logic 902, the dynamic routing logic 904, the duplication logic 906, the policy review logic 908, the testing logic 910, the load monitoring logic 912, the dynamic failover logic 914, flowchart 200 (including any step of flowchart 200), flowchart 300 (including any step of flowchart 300), flowchart 400 (including any step of flowchart 400), flowchart 500 (including any step of flowchart 500), flowchart 600 (including any step of flowchart 600), flowchart 700 (including any step of flowchart 700), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A proxy system to dynamically failover authentication traffic to a backup authentication system, the proxy system comprising:
    a memory; and
    a processing system coupled to the memory, the processing system configured to:
        determine that a primary authentication system is incapable of providing a valid response to an authentication request, which is directed to the primary authentication system and which requests authentication of a principal; and
        cause the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

2. The proxy system of claim 1, wherein the authentication package comprises an authentication artifact and metadata associated with the authentication artifact;
    wherein the authentication artifact is signed with a cryptographic key belonging to the primary authentication system;
    wherein the authentication artifact comprises a claim that is usable to authenticate the principal; and
    wherein the metadata comprises the first principal identifier and the credential verification information.

3. The proxy system of claim 1, wherein the processing system is configured to determine that the primary authentication system is incapable of providing a valid response to the authentication request by performing the following operations:
    storing information, which indicates that the primary authentication system is incapable of providing a valid response to the authentication request, by the proxy system prior to receipt of the authentication request at the proxy system; and
    reviewing the information by the proxy system to determine that the primary authentication system is incapable of providing a valid response to the authentication request.

4. The proxy system of claim 1, wherein the processing system is further configured to:
    receive a second authentication request, which requests authentication of a second principal, the second authentication request directed to the primary authentication system;
    duplicate the second authentication request, which results in first and second instances of the second authentication request;
    provide the first instance of the second authentication request to the primary authentication system;
    provide the second instance of the second authentication request to the backup authentication system;
    forward a first response, which is received from the primary authentication system in response to the first instance of the second authentication request, to the principal; and
    not forward a second response, which is received from the backup authentication system in response to the second instance of the second authentication request, to the principal.

5. The proxy system of claim 1, wherein the processing system is further configured to:
    test a response of the backup authentication system to a simulated outage of the primary authentication system over a period of time while the primary authentication system is capable of providing valid responses to authentication requests by routing the authentication requests, which are directed to the primary authentication system, to the backup authentication system during the period of time.

6. The proxy system of claim 1, wherein the processing system is configured to:
    cause the backup authentication system to authenticate the principal in accordance with a federated identity protocol.

7. The proxy system of claim 1, wherein the processing system is further configured to:
    determine that a load of the primary authentication system is greater than or equal to a load threshold; and
    redirect a portion of the load of the primary authentication system to the backup authentication system based at least in part on a determination that the load of the primary authentication system is greater than or equal to the load threshold.

8. The proxy system of claim 1, wherein the processing system is further configured to:
  redirect a portion of a load of the primary authentication system to the backup authentication system while the primary authentication system is capable of providing valid responses to requests to authenticate principals; and
  monitor a performance of the backup authentication system as the backup authentication system handles the portion of the load of the primary authentication system.

9. The proxy system of claim 1, wherein the processing system is further configured to:
  determine that an authentication policy changes to disallow authentication of the principal after the principal is authenticated by the backup authentication system; and
  cause the authentication artifact to be revoked so that the authentication artifact is unusable to authenticate the principal based at least in part on the authentication policy changing to disallow authentication of the principal.

10. A method of dynamically failing over authentication traffic to a backup authentication system by a proxy system, the method comprising:
  receiving an authentication request, which requests authentication of a principal, at the proxy system, the authentication request directed to a primary authentication system;
  determining, by the proxy system, that the primary authentication system is incapable of providing a valid response to the authentication request; and
  causing, by the proxy system, the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

11. The method of claim 10, wherein the authentication package comprises an authentication artifact and metadata associated with the authentication artifact;
  wherein the authentication artifact is signed with a cryptographic key belonging to the primary authentication system;
  wherein the authentication artifact comprises a claim that is usable to authenticate the principal; and
  wherein the metadata comprises the first principal identifier and the credential verification information.

12. The method of claim 10, wherein determining that the primary authentication system is incapable of providing a valid response to the authentication request comprises:
  providing the authentication request to the primary authentication system by the proxy system based at least in part on the authentication request being directed to the primary authentication system; and
  not receiving a valid response to the authentication request at the proxy system from the primary authentication system.

13. The method of claim 10, further comprising:
  receiving a second authentication request, which requests authentication of a second principal, at the proxy system;
  providing the second authentication request to the backup authentication system by the proxy system;
  receiving a notification from the backup authentication system at the proxy system, the notification indicating that the backup authentication system is incapable of providing a valid response to the second authentication request; and
  causing, by the proxy system, the primary authentication system to authenticate the principal by dynamically routing the second authentication request to the primary authentication system as a result of the notification indicating that the backup authentication system is incapable of providing a valid response to the second authentication request.

14. The method of claim 10, further comprising:
  receiving a second authentication request, which requests authentication of a second principal, at the proxy system, the second authentication request directed to the primary authentication system;
  duplicating the second authentication request by the proxy system, which results in first and second instances of the second authentication request;
  providing the first instance of the second authentication request to the primary authentication system by the proxy system;
  providing the second instance of the second authentication request to the backup authentication system by the proxy system;
  forwarding a first response, which is received from the primary authentication system at the proxy system in response to the first instance of the second authentication request, to the principal; and
  not forwarding a second response, which is received from the backup authentication system at the proxy system in response to the second instance of the second authentication request, to the principal.

15. The method of claim 10, further comprising:
  reviewing an authentication policy by the proxy system to identify a requirement that a first proportion of authentication requests that are received by the proxy system are to be provided to the primary authentication system and a second proportion of the authentication requests are to be provided to the backup authentication system;
  receiving a second authentication request, which requests authentication of a second principal, at the proxy system, the second authentication request directed to the primary authentication system; and
  causing, by the proxy system, the backup authentication system to authenticate the second principal using a second authentication package received from the primary authentication system, based at least in part on a principal identifier in the second authentication package that identifies the second principal corresponding to a principal identifier in the second authentication request that identifies the second principal and further based at least in part on a second credential of the second principal in the second authentication request being verified using second credential verification information in the second authentication package that is usable to verify the second credential, by dynamically routing the second authentication request to the backup authentication system based on the requirement of the authentication policy.

16. The method of claim 10, further comprising:
testing, by the proxy system, a response of the backup authentication system to a simulated outage of the primary authentication system over a period of time while the primary authentication system is capable of providing valid responses to authentication requests by routing the authentication requests, which are directed to the primary authentication system, to the backup authentication system during the period of time.

17. The method of claim 10, wherein dynamically routing the authentication request to the backup authentication system comprises:
notifying the backup authentication system that the authentication request is sent from the proxy system; and
wherein the method further comprises:
receiving a response to the authentication request from the backup authentication system at the proxy system based at least in part on the backup authentication system being notified that the authentication request is sent from the proxy system.

18. The method of claim 17, wherein dynamically routing the authentication request to the backup authentication system comprises:
notifying the backup authentication system of a reason that the authentication request is sent from the proxy system; and
wherein receiving the response to the authentication request comprises:
receiving the response to the authentication request from the backup authentication system at the proxy system further based at least in part on the reason corresponding to a reference reason.

19. The method of claim 10, further comprising:
determining by the proxy system that an authentication policy changes to disallow authentication of the principal after the principal is authenticated by the backup authentication system; and
causing, by the proxy system, the authentication artifact to be revoked so that the authentication artifact is unusable to authenticate the principal based at least in part on the authentication policy changing to disallow authentication of the principal.

20. A computer program product comprising a computer-readable storage medium having instructions recorded thereon for enabling a processor-based proxy system to dynamically failover authentication traffic to a backup authentication system by performing operations, the operations comprising:
determining that a primary authentication system is incapable of providing a valid response to an authentication request, which is directed to the primary authentication system and which requests authentication of a principal; and
causing the backup authentication system, which is isolated from the primary authentication system, to authenticate the principal using an authentication package received from the primary authentication system, based at least in part on a first principal identifier in the authentication package that identifies the principal corresponding to a second principal identifier in the authentication request that identifies the principal and further based at least in part on a credential of the principal in the authentication request being verified using credential verification information in the authentication package that is usable to verify the credential, by dynamically routing the authentication request to the backup authentication system as a result of the primary authentication system being incapable of providing a valid response to the authentication request.

* * * * *